United States Patent [19]

Green et al.

[11] Patent Number: 5,073,930
[45] Date of Patent: Dec. 17, 1991

[54] METHOD AND SYSTEM FOR RECEIVING AND DISTRIBUTING SATELLITE TRANSMITTED TELEVISION SIGNALS

[76] Inventors: James A. Green, Rte. 4, Box 402, Tallahassee, Fla. 32304; Brian F. Hearn, 1555 Delaney Dr., Apt. 414, Tallahassee, Fla. 32308

[21] Appl. No.: 423,146

[22] Filed: Oct. 19, 1989

[51] Int. Cl.⁵ .................. H04N 7/167; H04H 1/04
[52] U.S. Cl. .................. 380/10; 358/86; 455/6; 380/13
[58] Field of Search .............. 358/86; 455/3, 6

[56] References Cited

U.S. PATENT DOCUMENTS

| | | | |
|---|---|---|---|
| 3,665,316 | 5/1972 | Jeffers | 455/6 |
| 3,730,980 | 5/1973 | Kirk, Jr. | 380/13 |
| 3,936,594 | 2/1976 | Schubin et al. | 380/19 |
| 4,023,104 | 5/1977 | Rheinfelder | 455/6 |
| 4,066,966 | 1/1978 | Takeuchi et al. | 340/517 |
| 4,130,801 | 12/1978 | Prygoff | 455/3 |
| 4,183,054 | 1/1980 | Patisaul et al. | 358/86 |
| 4,395,734 | 7/1983 | Rypkema | 358/194.1 |
| 4,429,418 | 1/1984 | Hooper | 455/314 |
| 4,484,218 | 11/1984 | Boland et al. | 358/86 |
| 4,486,773 | 12/1984 | Okubo | 358/84 |
| 4,509,198 | 4/1985 | Nagatomi | 455/4 |
| 4,512,033 | 4/1985 | Schrock | 455/2 |
| 4,513,315 | 4/1985 | Dekker et al. | 358/86 |
| 4,530,008 | 7/1985 | McVoy | 380/23 |
| 4,532,543 | 7/1985 | Groenewegen | 358/86 |
| 4,538,174 | 8/1985 | Gargini et al. | 358/86 |
| 4,538,175 | 8/1985 | Balbes et al. | 358/86 |
| 4,545,048 | 10/1985 | Hauk et al. | 370/1 |
| 4,545,075 | 10/1985 | Miller et al. | 455/612 |
| 4,556,988 | 12/1985 | Yoshisato | 455/182 |
| 4,558,358 | 12/1985 | Onda | 358/86 |
| 4,580,161 | 4/1986 | Petrus et al. | 380/12 |
| 4,586,081 | 4/1986 | St. Arnuad et al. | 380/19 |
| 4,592,093 | 5/1986 | Ouchi et al. | 455/4 |
| 4,648,123 | 3/1987 | Schrock | 455/67 |
| 4,677,686 | 6/1987 | Hustig et al. | 455/5 |
| 4,709,418 | 11/1987 | Fox et al. | 455/612 |
| 4,710,972 | 12/1987 | Hayashi et al. | 455/179 |
| 4,761,825 | 8/1988 | Ma | 455/183 |
| 4,866,787 | 9/1989 | Olesen | 455/3 |
| 4,901,367 | 11/1988 | Nicholson | 455/5 |

OTHER PUBLICATIONS

Konishi et al., "Satellite Broadcasting", 89 *SMPTE Journal*, No. 3, pp. 162-166 (Mar. 1980), First Printed Dec. 1978.
Grant, "Direct Broadcast from Lower Power Satellites", 81 *Proceedings of the IEEE Internat'l Conf. on Comm.*, pp. 26.1.1-26.1.5, (Jun. 1981).
Cooper, "How to Build A Satellite TV Receiver", *Radio Electronics*, (1981).
Douville, "A 12-GHz Low-Cost Earth Terminal for Direct TV Reception from Broadcast Satellites", IEEE Proceedings on Consumer Electronics, (1977).
Jurgen, "Chasing Japan in the HDTV Race", 26 *IEEE Spectrum*, No. 10, pp. 26-30, (Oct. 1989).
Tannas Jr., "HDTV Displays in Japan: Projection-CRT Systems on Top", *IEEE Spectrum*, 0018-9235/89/1000-0031, pp. 31-33, (Oct. 1989).

*Primary Examiner*—Bernarr E. Gregory
*Attorney, Agent, or Firm*—Nixon & Vanderhye

[57] ABSTRACT

A television distribution system includes a frequency agile satellite transponder down converter operating in the satellite block converted frequency range, typically 950-1450 MHz, along with an IF stage incorporating bandpass filtering and a frequency agile up converter. This arrangement allows a head-end configuration with optimum selection of transponders from one or more satellites and with both vertical and horizontal polarities. The transponders are converted to an available slot allowing twelve slots to accommodate transponders of preference. The block may then be distributed to multiple subscribers in apartment complexes, condominiums and subdivisions.

34 Claims, 14 Drawing Sheets

TRANSPONDER LINE AMP

SATELLITE TRANSPONDER PROCESSOR

SATELLITE PROCESSOR

4 PORT ADDRESSABLE CABLE SELECTOR (ONE PER SUBSCRIBER)

FIG. 7 SUBSCRIBER CONTROL SYSTEM (SCS-1000)

AMPLITUDE MODULATOR

SUBSCRIBER CONTROL SYSTEM

TV-TOP CONTROLLER

TV TOP CONTROL UNIT

METHOD AND SYSTEM FOR RECEIVING AND DISTRIBUTING SATELLITE TRANSMITTED TELEVISION SIGNALS

FIELD OF THE INVENTION

This invention relates to receipt and distribution of television signals from satellites over cable-based distribution systems. More particularly, the present invention relates to earth stations which receive television signals from plural satellites and distribute the received signals to subscribers over cable type signal links. Still more specifically, one aspect of the invention relates to a frequency agile television signal distribution system in which signals from plural satellites and/or satellite polarizations are frequency "mapped" into selected satellite transponder frequencies which are then distributed over coaxial cables for decoding and processing at the subscriber end by conventional satellite receivers.

BACKGROUND AND SUMMARY OF THE INVENTION

The use of geosynchronous satellites to distribute television signals has revolutionized the television broadcasting industry and helped to make cable television distribution systems possible. As is well known, there are many communications satellites encircling the earth occupying so-called "geosynchronous orbits" (meaning the satellites appear to be stationary with respect to fixed points on the earth). These satellites receive television signals originating from the earth (so-called "uplink" signals) and retransmit those received signals back to earth (the retransmitted signals are called "downlink" signals) While satellites typically employ directional antennas to transmit the downlink signals, the high altitude of the satellites ensures that a large portion of the earth can receive the downlink signals. Thus, a single satellite can distribute television broadcasting signals to entire continents or to large portions of continents.

For television signals, the uplink and downlink frequency bands are divided into a plurality of channels or "transponders". Satellites operating in the so-called "C-band" (3700-4200 MHz) provide standardized 40 MHz channel spacing—thus providing a 500 MHz-wide band or block of frequencies defining 12 channels of a given polarization (horizontal or vertical). Newer C-band satellites provide staggered horizontally and vertically polarized channels (absolute channel spacing is only 20 MHz but adjacent channels of the same polarization are spaced 40 MHz apart) so that 24 different 40 MHz-wide channels are provided within the 500 MHz C-band satellite bandwidth. Satellite receiving antennas commonly provide feed horns and other related components capable of separating horizontally and vertically polarized signals—permitting receiving stations to separate the 12-channel block of horizontally polarized signals from the interleaved and overlapping 12-channel block of vertically polarized signals. Thus, the odd numbered channel transponders are typically transmitted on one polarity, and the even number transponders are transmitted on a polarity 90 degrees away from the given polarity A satellite antenna with a "dual polarity feed horn" typically provides two coaxial cable transmission line outputs —one cable carrying the odd (first polarity) transponder channels and the other cable carrying the even (second polarity) transponder channels.

The C-band nominal transponder frequencies are standardized so that a transponder for a given channel number will have the same nominal frequency regardless of which satellite is transmitting it. Some satellites also provide additional television signal transponders on the so-called "Ku-band" (11.8-12.3 GHz). This additional 500 MHz-wide band has not been standardized with respect to transponder center frequencies, however, so that channel spacing and channel polarization may vary from one satellite to another. To receive Ku-band signals, earth stations must include programmable "frequency agile" receivers that can receive the signals at virtually any center frequency within the Ku-band.

Since transponder frequency bands are uniform from one satellite to another, satellites are spaced in orbit relative to one another such that a directional earth-based satellite antenna may be aimed or "focused" on a single satellite at a time. Downlink signal levels received by earth receiving stations are extremely low in level—mandating the use of directional high gain receiving antennas (such as parabolic "dishes") to obtain sufficient received signal levels Thus, a typical satellite receiving antenna must be physically re-aimed to receive the signals from a different satellite. Thus, multiple antennas are required to receive signals from multiple satellites simultaneously. Typically, only a subset of transponders of a particular satellite may be active at any particular time, and only a subset of the active channels may be suitable or desirable for viewing. It is therefore typically important in most commercial multi-subscriber systems to provide multi-satellite receiving capability (e.g., by providing multiple fixed antennas aimed at different satellites) along with a capability to select only a subset of the received satellite transponder television signals for distribution to subscribers.

Some ku-band signals and all C-band signals both use standard 40 MHz wide (actually 36 MHz) channel bandwidths and other channel parameters. Satellite-transmitted television signals include a frequency modulated (FM) video signal and generally use a 6.2 (or 6.8) MHz audio subcarrier signal that is frequency modulated with the audio signal. This FM/FM format is very different from the conventional NTSC terrestrial television broadcasting signals transmitted by all domestic U.S. television broadcasting stations (such terrestrial signals include a vestigial sideband amplitude modulated video portion having approximately a 5.75 MHz bandwidth and a frequency modulated sound carrier for a total bandwidth of about 6 MHz). Standard VHF/UHF television receivers are therefore not directly compatible with satellite television transmissions, and additional signal processing is required to convert satellite transponder signals to a form receivable by a standard receiver. The signals received from satellite must either be demodulated and converted into standard NTSC format television signals for application to the tuner of a conventional television receiver; or the satellite signals may alternately be received and demodulated to provide baseband video and audio signals which may then be applied to baseband inputs of a studio type monitor and audio system or the like.

Generally, a home television viewer watching television signals transmitted by satellite obtains those signals either directly via a satellite receiving antenna in his yard, indirectly via a cable distribution network, or indirectly via a local VHF/UHF television station. Television stations typically receive network "feeds" via satellite receivers and retransmit the signals over normal VHF and/or UHF television channels in NTSC standard television broadcast format for reception by receivers.

In most urban areas, cable television companies supply NTSC television signals (some timers in scrambled format) over coaxial cables to subscribers, many of these signals (e.g., so-called "premium channels" such as HBO, SHOWTIME, etc. and so-called "national network" channels such as the Fox Television network, ESPN and the Turner Broadcasting Network) being obtained from satellites. The cable television company receives the signals from one or more satellites (typically via one or more fixed position high-gain satellite receiving antennas directed the appropriate satellites) and converts selected received signals to NTSC broadcast type AM signals at frequencies in the VHF/UHF frequency range for application to the cable distribution system. Decoder units installed at subscribers' homes generally shift the frequency of selected signals carried by the cable to a preselected standard VHF television broadcast channel frequency (e.g., 60-66 MHz corresponding to VHF television channel 3) for further demodulation by the subscribers' television receivers, and may also "descramble" certain cable signals (e.g., by re-inserting suppressed sync signals, suppressing interfering signals intentionally applied to the cable, or the like) in a well-known manner. The cable television "head end" typically provides appropriate frequency conversion of satellite-obtained television signals, locally generated television signals, and locally received television signals so that the distributed signals do not interfere with one another and so fall within appropriate frequency conversion bands or channels for selection by the subscriber decoders (or "cable ready" television receivers), and provide a generally contiguous block of occupied channels (so that each "channel" defined by the cable television decoder corresponds to an active signal—thus preventing subscribers from having to view channels carrying only noise when switching between active channels).

The following is a non-exhaustive but somewhat representative listing of prior patents and publications related to "cable television" and related television signal distribution techniques:

U.S. Pat. No. 4,530,008 to McVoy;
U.S. Pat. No. 4,580,161 to Petrus;
U.S. Pat. No. 4,558,358 to Onda;
U.S. Pat. No. 4,066,966 to Takeuchi et al;
U.S. Pat. No. 4,484,218 to Boland;
U.S. Pat. No. 4,486,773 to Okubo;
U.S. Pat. No. 4,538,174 to Gargini et al;
U.S. Pat. No. 3,936,594 to Schubin et al;
U.S. Pat. No. 4,183,054 to Patisaul;
U.S. Pat. No. 4,395,734 to Rypkema;
U.S. Pat. No. 4,512,033 to Schrock;
U.S. Pat. No. 4,648,123 to Schrock;
U.S. Pat. No. 4,513,315 to Dekker et al; and
U.S. Pat. No. 4,532,543 to Groenewegen.

In more rural and remote areas where cable television is unavailable, people use entire "stand-alone" satellite receiving stations for receiving satellite television transmissions—typically providing a received television signal quality that far surpasses signal quality from cable television or reception of terrestrial signals. Such earth stations typically include a satellite receiving antenna ("dish") and associated motor-controlled positioning mount; a low noise amplifier ("LNA") located at the antenna for amplifying the weak signals received by the antenna; a LNA block converter stage ("LNB"; usually located at the antenna) for down-converting the block of transponders (channels) received from the satellite (typically this down-converting stage converts C-band signals from 3.7-4.2 GHz down to the 900 MHz-1500 MHz range and converts Ku-band signals to the same range) for conveyance from the antenna to inside the home over coaxial transmission lines; and a conventional "satellite receiver" which performs the channel selection and further frequency/mode conversion processing required to allow the user to view a selected television signal on a standard television receiver and/or video monitor.

Such satellite receivers have been commercially available for quite some time from a variety of different manufacturers such as, for example, Microdyne Corp. of Ocala, Fla. and Zenith Electronics of Glenview, Ill. A typical modern satellite receiver includes a programmable microprocessor and can receive and process any C-band or Ku-band satellite transponder accessible to domestic and commercial downlinks. The satellite receivers typically allow users to select frequency from front panel controls and can digitally store preset settings for multiple combinations of frequency, format, signal polarity and satellite. Many satellite receivers also include integrated Videocipher II decoders to provide conventional descrambling of scrambled satellite television transmissions.

The following is a non-exhaustive but somewhat representative listing of prior publications and patents related to satellite receivers and receiving techniques:

U.S. Pat. No. 4,545,075 to Miller et al;
U.S. Pat. No. 4,130,801 to Prygoff;
U.S. Pat. No. 4,429,418 to Hooper;
U.S. Pat. No. 4,556,988 to Yoshisato;
U.S. Pat. No. 4,509,198 to Nagatomi;
U.S. Pat. No. 4,538,175 to Balbes et al;
U.S. Pat. No. 4,710,972 to Hayashi et al;
U.S. Pat. No. 4,761,825 to Ma;
U.S. Pat. No. 4,592,093 to Ouchi et al;

Konishi et al, "Satellite Broadcasting", 89 *SMPTE Journal* no. 3, pages 162-66 (March 1980);

Grant, "Direct Broadcast from Lower Power Satellites", 1981 *Proceedings of the IEEE International Conference on Communications* pp. 26.1.1 to 26.1.5 (June 1981);

Cooper, "How to Build a Satellite TV Receiver", *Radio Electronics* (1981); and

Douville, "A 12-GHz Low-Cost Earth Terminal for Direct TV Reception from Broadcast Satellites", *IEEE Proceedings on Consumer Electronics* (1977).

Miller et al cited above disclose a fiber optic link for carrying received signals from the antenna site to a remote satellite receiver. Briefly, block converters are used to down-convert the antenna LNA output to a lower frequency band. A wide-band optical link is used to carry this down-converted output to the remote satellite receiver. At the satellite receiver end, another block converter up-converts the block of signals to their original frequencies for application to the satellite receiver.

As mentioned above, satellite earth stations are capable of providing extremely high quality received signals—in part because of a phenomenon known as the "FM improvement factor." Briefly, noise effects on the received image disappear when the received carrier level is sufficient to cause the receiver input to limit (i.e., when the carrier "fully quiets" the receiver). That is, when a sufficient signal level arrives at the receiver to start limiting action, the receiver quiets—and the background noise entirely disappears. The carrier level required to fully quiet a satellite receiver depends upon the sensitivity of the receiver, but can typically be easily obtained with a parabolic receiving antenna of sufficient diameter equipped with a relatively inexpensive low noise amplifier. Full quieting results in a much larger effective signal-to-noise ratio at baseband frequencies than is actually provided by the system components at satellite downlink frequencies. In contrast, no such "FM improvement factor" phenomenon applies to terrestrial free-space television broadcasting (or to conventional cable television signals) because these signals are transmitted in the NTSC AM format.

One proposal advanced in the past to overcome noise problems in cable television involves converting the received television signals at the head-end to digital signals, distributing the digital signals to subscribers (over coaxial or optical links) and converting the distributed signals back to analog form at the subscriber end. See Patisaul et al and Dekker et al cited above. The Patisaul et al patent teaches distributing VSB digitally encoded television signals via an optical transmission link to subscribers. Dekker et al relates to transmitting digital audio signals received from satellites over a community television distribution system. However, such conversions would require a significant amount of customized equipment at the subscriber end—substantially increasing the overall system cost.

In addition, a few experimental systems have been proposed which use optical fibers instead of coax to help eliminate noise. For example, in October 1986 Genstar Southern Development of Orange County, Fla. announced that it would offer cable TV service via fiber optic cable to 1,300 homes in Florida. The proposed system included a "head end" that received the television signals through satellite receivers. A selector node, connected to the head end by a 48-fiber single-mode fiber optic cable, was to select the channels for customer. In the home, an optical network interface was to translate the optical signal and transmit it over coaxial cable to the television receiver.

As those active in this art appreciate, a significant niche in the market for television signal distribution systems relates to so-called "community television" systems. A community television system typically provides television service to a relatively small "community" of subscribers such as the residents of an apartment building or complex of townhouses or condominiums; the guests of a hotel or motel; or patients within a hospital. Often, aesthetic considerations, lack of space and other considerations prevent each resident from erecting his own VHF/UHF or satellite receiving antenna and moreover, cost and convenience considerations dictate that residents share an overall television distribution system rather than each purchasing and installing their own system. Condominium and townhome complexes often provide single coaxial cable "drops" from a central service point to each individual dwelling. While cable television companies sometimes make use of such preexisting cables to install cable television service on a subscription basis, it may in many cases benefit residents in terms of cost and signal quality to purchase and provide their own independent community television system. In the case of hotels, motels and hospitals, a significant profit can be realized by controlling the distribution of premium and non-premium television transmissions and offering those transmissions to guests/patients on a subscriber or pay-per-view basis.

In the past, such community television systems typically received and distributed signals from one or more VHF/UHF antenna installed on the building roof or on a tower. However, with the advent of satellite television and the recent decrease in the cost and wide availability of satellite receiving equipment, many community television systems have purchased satellite receiving antennas and associated earth station components. These community television systems typically receive the satellite signals, descramble the received signals if necessary, convert the received satellite transmissions into NTSC format and distribute the converted signals to viewers.

Despite intensive development effort expended on the cable and community television industry, much further improvement is possible. For example, typical community broadcasting systems offer only a limited selection of channels and received signal quality may be mediocre if only terrestrial broadcasts are being received. Cost considerations are almost always critical in these types of systems. It would be highly advantageous to provide an increased selection of channels at the same or better signal quality using less expensive equipment.

The present invention provides an improved satellite television signal receiving and distribution system incorporating some highly innovative concepts. The resulting system provides a number of advantages over past systems, including the following highly advantageous features:

Economic distribution of high-quality FM satellite signals at frequencies compatible with standard conventional satellite receivers (thus permitting subscribers to take advantage of the performance, quality and special features provided by stand-alone earth stations without requiring them to purchase and install expensive and possibly impractical satellite antennas);

Multiplexed distribution of many (e.g., 48) satellite transponders over single subscriber drop cables, thus providing full compatibility with prewired building complexes and saving cabling costs (normal satellite transmission formats generally prevent transmission of more than 12 transponders in the 950–1450 MHz down-converted C-band over a single cable);

The ability to distribute any selected transponders from any of multiple satellites and from either polarity—thus providing customized blocks of selected active channels from several satellites in an integrated manner;

Distribution of FM satellite transponder signals (as opposed to conventional distribution of AM NTSC signals) to provide superior picture and sound quality as well as full compatibility with standard mass-produced satellite receivers;

The ability to provide subscribers with pay-per-view capabilities economically and automatically using already existing techniques provided for satellite receiving earth stations;

The ability to pass high definition television (HDTV) signals directly to subscribers without system alteration;

The capability of combining C-band and Ku-band satellite signals on the same cable;

The ability to economically provide full subscriber addressability; and

The capability of correcting erroneous center frequencies of received satellite transponder signals prior to distributing the signals (such frequency errors can be caused by poor LNB down conversion or satellite transponder variations).

Conventional wisdom in the prior art was to convert received satellite signals into standard NTSC AM signal formats before distribution to permit subscribers' conventional television receivers to successfully demodulate the distributed signals. In accordance with one important aspect of the present invention, this conventional wisdom is entirely ignored. Instead of distributing AM television signals, the present invention provides distribution of a block of transponder signals each in the same form as they are received from a satellite downlink. The distributed FM/FM signals are completely incompatible with standard television signals, but are fully compatible with standard off-the-shelf satellite receivers designed for decoding/selecting signals obtained from a standard satellite receiving antenna/LNA/LNB arrangement. Thus, each subscriber simply uses a standard satellite receiver of the type designed for stand-alone satellite earth station receiving systems for selection of a particular transponder ("channel") and conversion of the transponder signal to either baseband (for viewing on a studio type video monitor) or NTSC AM format (for viewing on a standard television receiver).

Several advantages are obtained by distributing satellite transponder signals without converting the signals to NTSC (or some other) format. For example, standard off-the-shelf mass-produced satellite receiver units can be used for decoding/demodulating at subscriber locations—thus significantly decreasing system cost and complexity while increasing system reliability and simplifying inventory logistics. Using standard satellite receivers also permits the system provided by the present invention to take advantage of features already offered to stand-alone "TVRO" earth station owners (including subscriber-addressable signal descrambling using the standard Videocipher II system) and additional features that may become available to such earth station owners (e.g., "Video Pal" pay-per-view for use in connection with Videocipher II descrambling, and decoding of HDTV signals transmitted over satellite transponders). As will be appreciated, HDTV signals can be passed over existing satellite transponders (see, e.g., Jurgen, "Chasing Japan in the HDTV Race", 26 *IEEE Spectrum* No. 10, pp. 26-30 (October 1989).

The present invention, however, actually provides subscribers with additional features not typically available from a stand-alone TVRO earth station. For example, typical earth stations operated by individuals for their own use generally have only a single satellite receiving antenna which can be aimed at only a single satellite at a time (e.g., using a motorized drive) and which generally cannot simultaneously provide horizontal and vertically polarized signals (unless dual cables are provided from the antenna to the satellite receiver and the satellite receiver includes circuitry for selecting between polarities). Thus, a viewer using a typical earth station is limited to selecting from a maximum of 12 (or in some cases 24) transponders provided by a single satellite. Selecting the other polarization may be relatively easy, but selecting another satellite is typically more time-consuming (since the antenna must actually be physically redirected manually or using a motorized antenna positioner). Moreover, most satellites typically do not "fill" all 24 transponders with useful television signals all the time, and many of the signals transmitted by a particular satellite may be of no interest to the average viewer.

In accordance with a further aspect of the present invention, transponders from multiple satellites and/or multiple polarities may be "mapped" or converted into desired frequency transponder "slots" within the signals distributed to subscribers (see FIG. 2A). Hence, a 12-transponder block of channels presented to subscriber satellite receivers may contain signals from several different satellites and from both horizontal and vertical polarizations. In fact, the preferred embodiment system provided by the present invention is capable of "mapping" any transponder signal of any satellite into any desired transponder frequency (i.e., the same or different transponder frequency). Moreover, errors in transponder center frequency can be corrected through this mapping process so that the transponder signals distributed to subscribers require no "fine tuning" by the satellite receivers located at the subscriber end plural.

In accordance with a further feature of the present invention, plural 12 transponder blocks of signals are distributed to subscribers while requiring only single cable "drops" to each subscriber location. Specifically, plural distribution cables each carrying a 12-channel block of satellite transponder signals are routed to a centralized location such as a "wiring chase". A multiplexer/selector for each subscriber is installed at the centralized location. The multiplexer/selector is remotely controlled by a cable selector located at the subscriber location, and selects which of the plural distribution cables are coupled to the subscriber's single "drop" cable. The multiplexer/selector is also addressable by a "subscriber control system" for enabling/disabling service to subscribers on a subscriber-by-subscriber basis.

BRIEF DESCRIPTION OF THE DRAWINGS

These and other features and advantages of the present invention will be better and more completely understood by referring to the following detailed description of a presently preferred exemplary embodiment in conjunction with the FIGURES, of which:

FIG. 7 is a schematic block diagram of the subscriber control system shown in FIG. 1B;

DETAILED DESCRIPTION OF A PRESENTLY PREFERRED EXEMPLARY EMBODIMENT

Figure 1A:
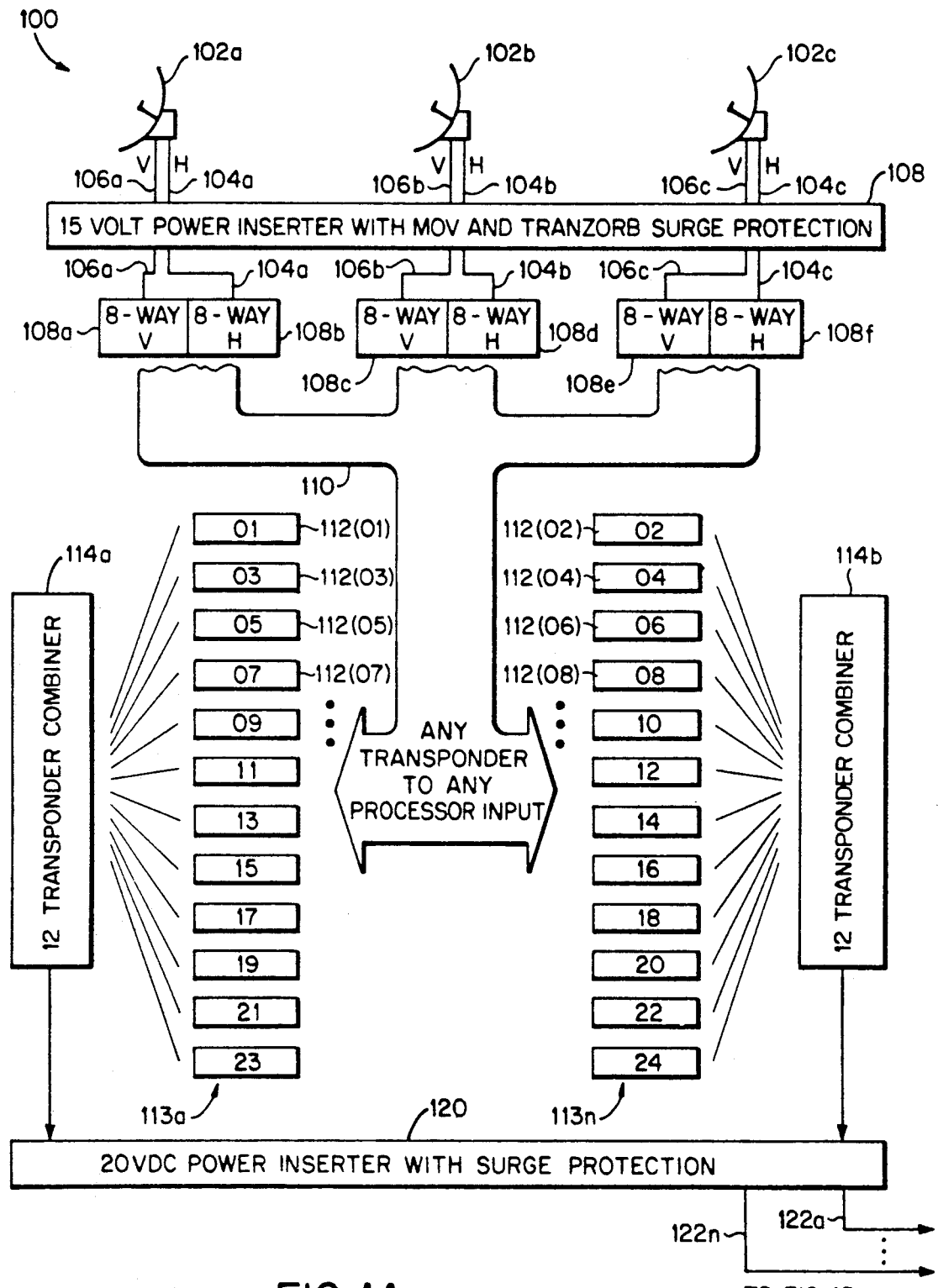
FIGS. 1A and 1B are together a block diagram of a presently preferred exemplary embodiment of a community television distribution system in accordance with the present invention.
Figure 1B:
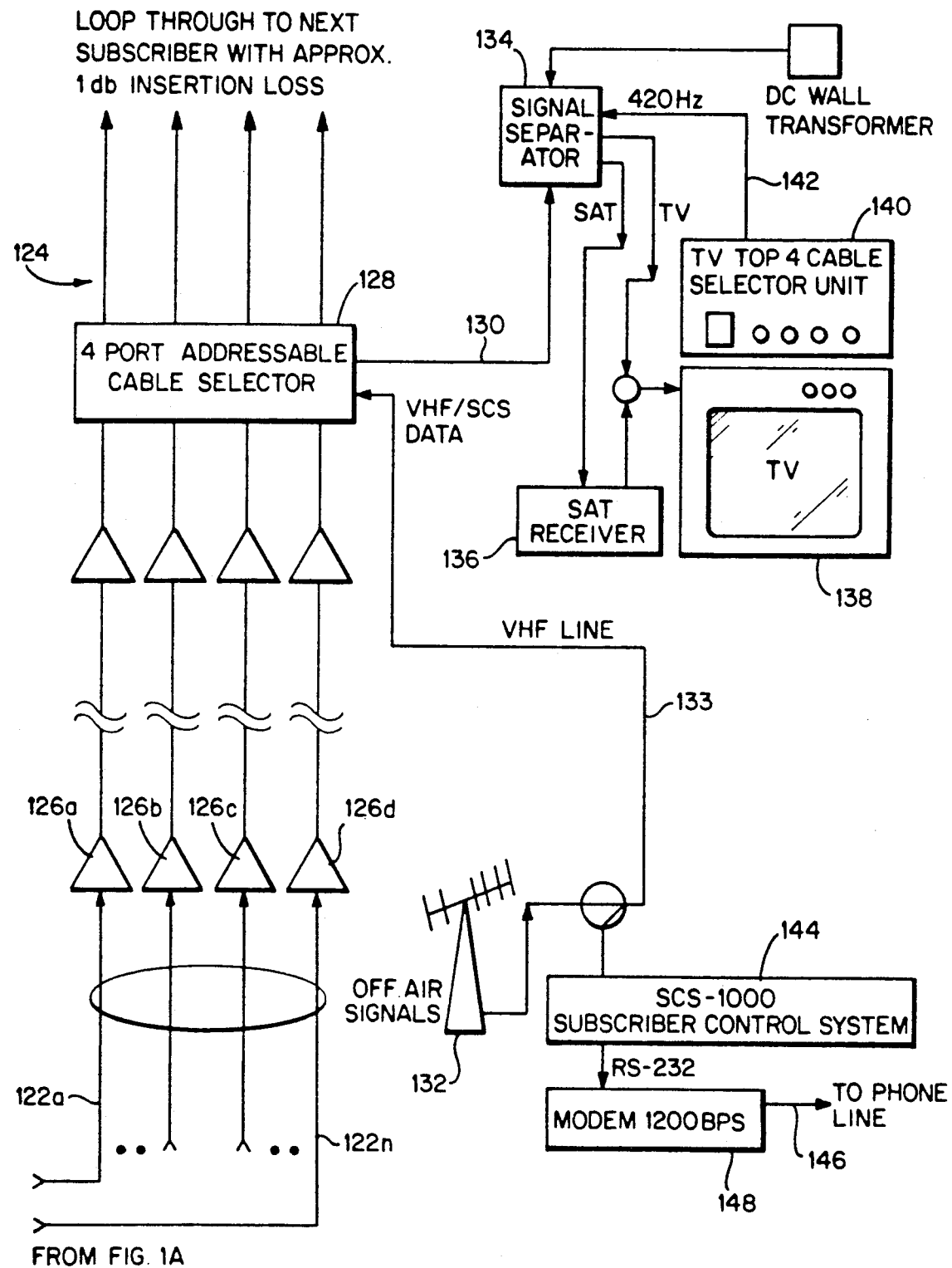

FIGS. 1A and 1B together are a schematic block diagram of the presently preferred exemplary embodiment of a community television distribution system 100 in accordance with the present invention. System 100 includes a so-called "head-end" shown in FIG. 1A which receives FM television transmissions from one or more satellite downlinks via a plurality of conventional satellite antennas "dishes" 102; and a distribution network (shown in FIG. 1B) which distributes the received signals to subscribers.

FIG. 1A shows three satellite receiving antennas 102, but any desired number of antennas may be provided. In the preferred embodiment, each of satellite antennas 102 is trained on a different satellite, and each of antennas 102 includes a conventional dual-polarized feedhorn arrangement to provide simultaneous separate reception and amplification of both horizontally and vertically polarized transponder signals. Thus, each of satellite antennas 102 provides separate horizontal and vertical transmission line outputs 104, 106, respectively, each of these transmission lines carrying a block of twelve satellite television transponder signals—for a maximum of seventy-two different transponder signals for the 3-antenna exemplary configuration shown in FIG. 1A. In addition, at least one of antennas 102 is capable of receiving Ku-band signals.

In the preferred embodiment, each of antennas 102 includes a conventional low-noise amplifier (LNA) and block converter (LNB). The LNB down-converts received C-band (and Ku-band) signals in a conventional manner to the range of 900-1500 MHz before applying the signals to transmission line outputs 104,106.

The transmission line outputs 104,106 pass through conventional power inserter/surge protection networks (shown generically in FIG. 1A's block 108) providing power insertion for the low-noise amplifier (LNA) and other components located with the antennas 102 and also providing protection from static electrical discharges from lightning strikes and the like. The transmission line outputs 104,106 are coupled to respective conventional 8-way power splitters 108 which split each transmission line signal into eight identical outputs isolated from one another. The outputs of each of splitters 108 are connected over a conventional interconnect bus/network 110 to the inputs of up to eight satellite transponder processors 112.

Two banks 113 of twelve satellite transponder processors 112 are shown in FIG. 1A, but in the preferred embodiment configuration forty-eight such transponder processors in four banks 113 are actually used. Each transponder processor 112 is connected to receive an output from one of splitters 108 (and thus receives the signals present on one of transmission line outputs 104,106). The transponder processor 112 performs a selected frequency "mapping" or conversion process (to be explained in great detail shortly) and produces a resulting frequency converted signal at its output. In the preferred embodiment, each transponder processor 112 processes the signals corresponding to a single satellite transponder and produces an output corresponding to that single transponder on any desired satellite transponder frequency. In the preferred embodiment, the outputs of each bank 113 of twelve transponder processors 112 are combined together by a transponder combiner 114. In the preferred embodiment, four such transponder combiners 114 are provided, with each transponder combiner acting to combine a different bank 113 of twelve different transponder signals together to form a block of twelve transponder signals.

Figure 2:
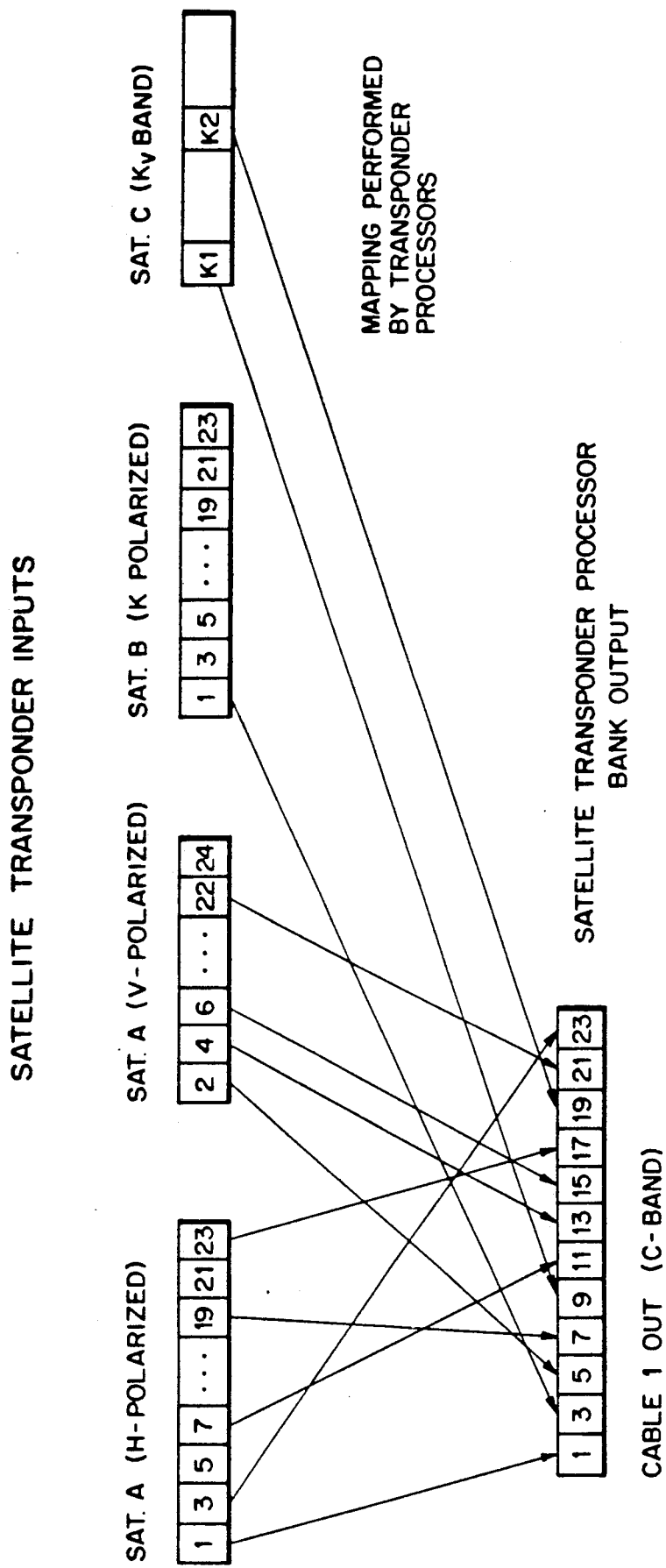
FIG. 2 is a schematic diagram of an exemplary mapping performed by a bank of transponder processors shown in FIG. 1.

In the preferred embodiment, each transponder processor 112 within a 12-processor bank 113 is preprogrammed to produce an output on a unique transponder frequency. More specifically, the signals combined by transponder combiner 114 from the outputs of a given 12-processor bank 113 of transponder processors 112 do not overlap one another in frequency but instead (in the preferred embodiment) provide a contiguous block of FM television signals in the range of 900-1500 MHz. Thus, the output of each transponder combiner 114 "looks" (in terms of frequency range, format, mode and other parameters) as if it might have been outputted directly by a single one of satellite antennas 102 on one of the horizontally polarized or vertically polarized transmission line outputs 104,106. However, the "mapping" performed by transponder processors 112 is flexible and easily customizable so that any desired satellite downlink transponder signal can be provided within any transponder frequency band provided at the output of transponder combiner 114. FIG. 2 shows one exemplary such mapping provided by a single transponder processor bank 113 from several different antenna transmission line outputs 104,106 into a single twelve-channel block of transponder frequencies.

The outputs of transponder combiners 114 pass through an additional power inserter (with surge protection) 120 and are then distributed over a plurality of cables 122 for distribution to subscribers. In the preferred embodiment, four coaxial distribution cables 122 are used to distribute the signals, with each of the four cables carrying a different 12-transponder "block" of FM television signals within the C-band frequency range of 900-1500 MHz. A plurality of cables 122 is used to prevent interference between overlapping signal frequencies. For example, in the preferred embodiment, cable 122a carries a block of transponder signals having center frequencies identical to those of the transponder signals carried by, for example, cable 122n. While up conversion might be used to multiplex these various signals onto a single cable, such additional frequency conversion techniques would increase the cost and complexity of the preferred embodiment distribution system 100 and make some of the distributed signals incompatible with standard satellite receivers.

FIG. 1B is a schematic block diagram of the distribution network 124 used to distribute the signals generated by the head-end portion of system 100 shown in FIG. 1A. Line amplifiers 126 provided in line with each of cables 122 at predetermined distance spacings provide amplification for the transponder signals carried by the cables. The 4-port addressable cable selector 128 is installed in line with network 124 at or near each subscriber location (that is, in the preferred embodiment an additional cable selector 128 is provided for each individual subscriber to permit each subscriber to independently select between cables 122). In the preferred embodiment, cable selector 128 is typically located in a so-called "wiring chase" (e.g., within an elevator shaft or utility room) remote from the actual subscriber location but convenient to the single individual "drop" coaxial cables which typically are prewired between the wiring chase and the subscriber residences. The cable selector 128 functions as a multiplexer which selects one of a plurality of cables 122 and provides that output on a subscriber's single drop cable 130.

As shown schematically in FIG. 1B, a conventional VHF/UHF television antenna 132 receives local television signals "off the air" and is also provided as an input to cable selector 128 in the preferred embodiment to permit the subscriber to select antenna 132. The output provided by cable selector 128 onto subscriber drop cable 130 in the preferred embodiment is thus a block of FM transponder signals (900–1500 MHz) existing one of the plurality of cables 122 selected by selector 128; and the VHF/UHF local television signals received by local antenna 132.

Within the subscriber's home, a signal separator 134 separates the 900–1500 MHz transponder block from the VHF/UHF standard television signals and applies that transponder block to a conventional off-the-shelf satellite receiver 136. The subscriber selects among the transponders within the block of transponder signals using the conventional satellite receiver 136 controls, and the satellite receiver demodulates and otherwise converts the selected transponder signal in a conventional fashion into standard NTSC amplitude modulated television signals for application to a conventional television receiver 138 (or alternatively, the satellite receiver 136 may provide baseband video and audio outputs for application to a high quality video monitor or the like, as is well known). The VHF/UHF local television receivers separated by signal 134 may also be applied to television receiver 136 in a conventional manner. Thus, satellite receiver 136 in conjunction with television receiver 138 may operate in the preferred embodiment in a manner identical to the way it would operate if connected directly to one of the transmission line outputs 104,106 of satellite antennas 102 (i.e., as if the head-end components shown in FIG. 1 and distribution network 124 did not intervene between the two)—but with substantial additional flexibility and channel capacity as will now be appreciated.

A 4-cable selector unit 140 is located at each subscriber location—preferably on or near television receiver 138. Selector unit 140 permits the subscriber to remotely control the multiplexing operation of the 4-port addressable cable selector 128. That is, cable selector unit 140 allows the subscriber to select which of the plurality of cables 122 will be selected by the addressable cable selector 128—and therefore in effect selects one of the plurality of banks 113 of transponder processors 112. In the preferred embodiment, control signals generated by cable selector unit 140 amplitude modulate a low frequency carrier signal (e.g., 420 Hz) which is applied over line 142 to signal separator 134. Signal separator 134 passes this modulated low frequency signal carrier over single drop cable 130 to the addressable cable selector 128, which is controlled by the data modulating the low frequency carrier signal. In additional, a subscriber control system 144 coupled to the cable selector (e.g., via the same line 133 coupling the local antenna 132 to the cable selector) provides supervisory control over subscriber cable selectors 128 (e.g., to activate or deactivate subscriber service) in response to digital control signals received, for example, from a remote source over a telephone line 146 via a conventional modem 148.

Figure 2A:
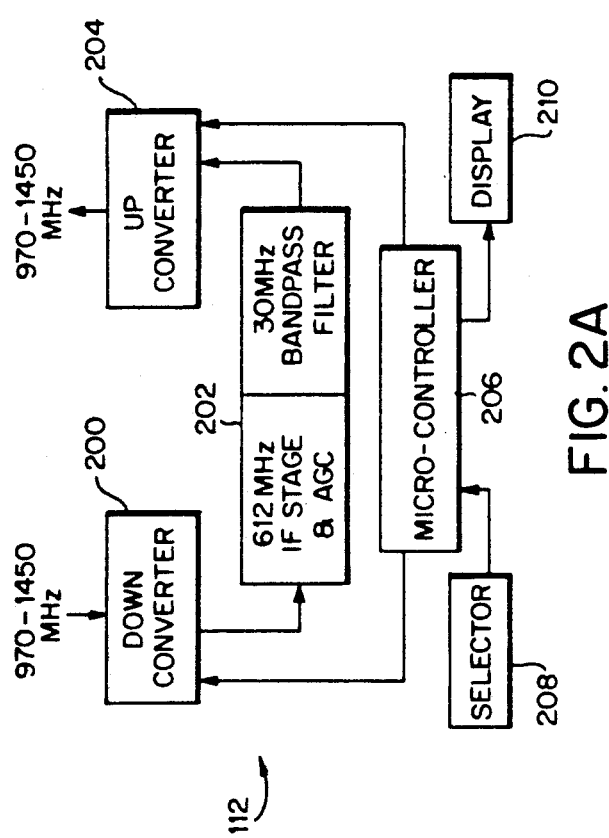
FIG. 2A is a block diagram of an exemplary one of the transponder processors shown in FIG. 1A.

FIG. 2A is a schematic block diagram of one of satellite transponder processors 112 shown in FIG. 1A. In the preferred embodiment, transponder processor 112 includes a down converter 200, an IF/AGC/bandpass filter stage 202, an up converter 204, a microcontroller 206, a selector 208, and a display 210. In the preferred embodiment, down converter 200 and up converter 204 are each digitally programmable under control by microcontroller 206, and the satellite transponder processor 112 may thus be termed "frequency agile". Briefly, satellite transponder processor 112 in the preferred embodiment accepts as an input a block of twelve satellite transponder television signals (in the frequency range of 950–1450 MHz in the preferred embodiment as down-converted by the LNB at the antenna) and produces as an output a single satellite transponder FM television signal. In the preferred embodiment, this single transponder television signal outputted by transponder processor 112 is within the same frequency range of 950–1450 MHz—and in the preferred embodiment has a center frequency exactly corresponding to a standard C-band satellite transponder center frequency within the standard down-converted range of 950–1450 MHz. The transponder signals are applied to the input of down converter 200 which down-converts the inputted transponder signals (under control of microcontroller 206) so that a desired one of the input transponder signals has a center frequency within the pass-band of a 612 MHz. IF stage. Microcontroller 206 is capable of controlling the exact down-conversion frequency provided by down-converter 200 to correct for errors in the input signal center frequency (e.g., due to satellite transponder error and/or low noise block converter error). IF stage/AGC/bandpass filter block 202 filters out all but the selected single transponder signal, automatically adjusts the gain of the selected signal to provide constant and uniform gain, and applies the gain-adjusted, filtered signal to the input of up converter 204. Up converter 204 converts the selected signal back to a signal having a center frequency within the original 950–1450 MHz—and more specifically to have a center frequency exactly matching a standard center frequency of a given desired satellite transponder within that band (as the transponder signal would have appeared directly from the antenna LNB).

Figure 3:
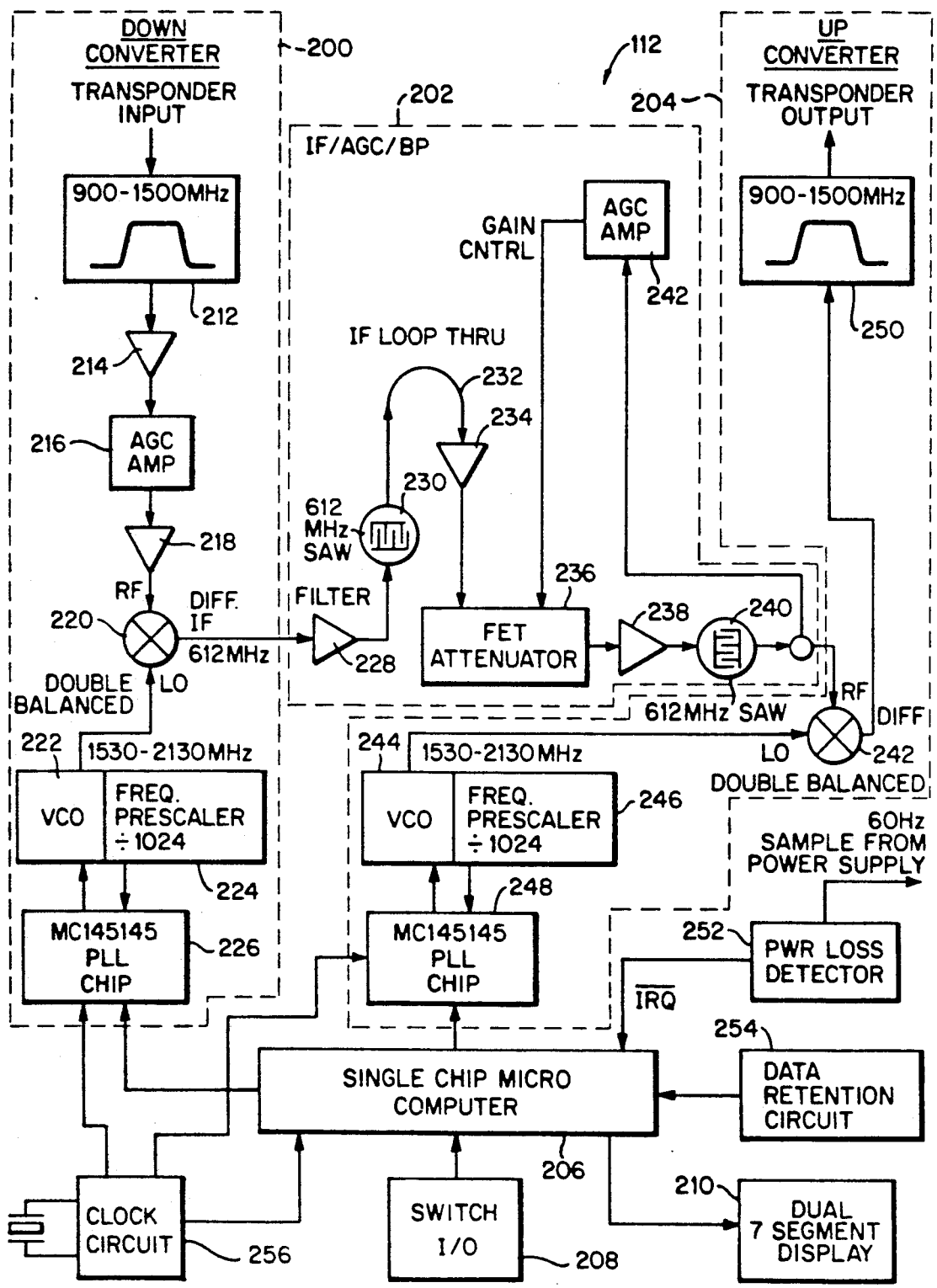
FIG. 3 is a more detailed block diagram of the FIG. 2 satellite transponder processor.

Microcontroller 206 controls the up conversion process performed by up converter 204 independently of the down conversion process performed by down converter 200. Thus, microcontroller 206 is capable of controlling down converter 200 to select any one of the input transponder signals, and then controls up converter 204 to convert that selected signal to any desired transponder output frequency. Selector 208 allows installation and maintenance personnel to select the transponder signal to be down converted by down converter 200 and the transponder frequency to which a resulting selected signal is up converted by up converter 204, while display 210 indicates the conversion frequencies that have been selected FIG. 3 is a more detailed schematic block diagram of an exemplary one of satellite transponder processors 112 preferred embodiment (preferably all of the transponder processors are identical to one another except for frequency settings programmed into them). In the preferred embodiment, down converter 200 includes a front-end 900-1500 MHz bandpass filter 212 of conventional design followed by a conventional buffer amplifier 214, conventional AGC (automatic gain control) amplifier 216 and further buffer amplifier 218. The output of buffer amplifier 218 is applied to one input of a conventional double balanced mixer 220 which heterodynes the buffer 218 output with a local oscillator frequency produced by VCO (voltage controlled oscillator) 222. In the preferred embodiment, VCO 222 is connected in a phase locked loop configuration with a conventional frequency prescaler (divide by 1024) 224 and a conventional phase locked loop integrated circuit type MC145145 (block 226; this integrated circuit includes a programmable divider, a phase detector and an error voltage generator as is well known). The local oscillator output frequency produced by VCO 222 is within the range of 1530-2130 MHz in the preferred embodiment, and is controlled by the data latched into the PLL chip 226. PLL chip 226 (which controls the VCO 22 output frequency) is connected to a serial data output produced by microcomputer 206 (in a conventional manner as described in, for example, data sheets published by Motorola) and provides frequency control in response to commands issued to it by the microcomputer.

Block 202 in the preferred embodiment is a conventional intermediate frequency amplifier stage including an automatic gain control amplifier and a bandpass filter. In the preferred embodiment, block 202 includes a buffer amplifier 228 which amplifies the output of double balance mixer 220 and applies the amplified difference signal to a 612 MHz SAW type interdigitated surface acoustic wave filter 230 of conventional design. SAW filter 230 passes only the 612 MHz difference frequency (plus and minus 15 MHz for a total passband of 30 MHz centering around the 612 MHz difference frequency) on to a conventional intermediate frequency amplifier "loop through" 232 (this "loop through" provides input and output connectors at the rear of the satellite transponder processor card/housing to provide access to the IF signal for testing purposes or the like). A buffer amplifier 234 amplifies the output of SAW filter 230 and applies this amplified output to the input of a conventional FET attenuator 236. The output of attenuator 236 is buffered by a further buffer amplifier 238 and further filtered by another 612 MHz SAW bandpass filter 240. The output of filter 240 is sampled by a conventional AGC amplifier 242 which provides a control signal controlling the attenuation provided by attenuator 236—thus maintaining substantially constant signal levels at the output of SAW filter 240 despite variations in the input signal level.

The output of SAW filter 240 is also applied to an input of a double balanced mixer 242 which is a part of the up converter 204. The local oscillator frequency input provided to mixer 242 is generated by a further phase locked loop circuit including a VCO 244, a frequency prescaler (divide by 1024) 246, and a further conventional PLL integrated circuit 248 (in the preferred embodiment, components 222,224,226 in down converter circuit 200 are identical to components 244,246,248 within up converter circuit 204). Microcomputer 206 independently controls the local oscillator frequency output provided by VCO 244 to be within the range of 1530-2130 MHz. Mixer 242 heterodynes this local oscillator frequency output of IF strip 202 to provide a single transponder signal somewhere within the 900-1500 MHz band—with the exact center frequency of the output signal being a function of the local oscillator frequency produced by VCO 244. This difference frequency output provided by mixer 242 is filtered by a conventional bandpass filter 250 before being outputted by transponder processor 112.

In the preferred embodiment, satellite transponder processor 112 further includes a power loss detector 252 which continually monitors for power failures and applies an interrupt request signal to microprocessor 206 whenever a power failure is detected. In addition, a data retention circuit 254 connected to microprocessor 206 insures that the data stored within the random access memory of microcomputer 206 is retained even in the event of a power failure The user input switches 208 connected to microcomputer 206 permit control of the frequency conversion parameters generated by the microcomputer, and a dual 7-segment display 210 provide monitoring of the up conversion and down conversion frequencies. A conventional clock circuit 256 provides clock synchronization signals for microcomputer 206 and phase locked loop chips 226,248.

Figure 4A:
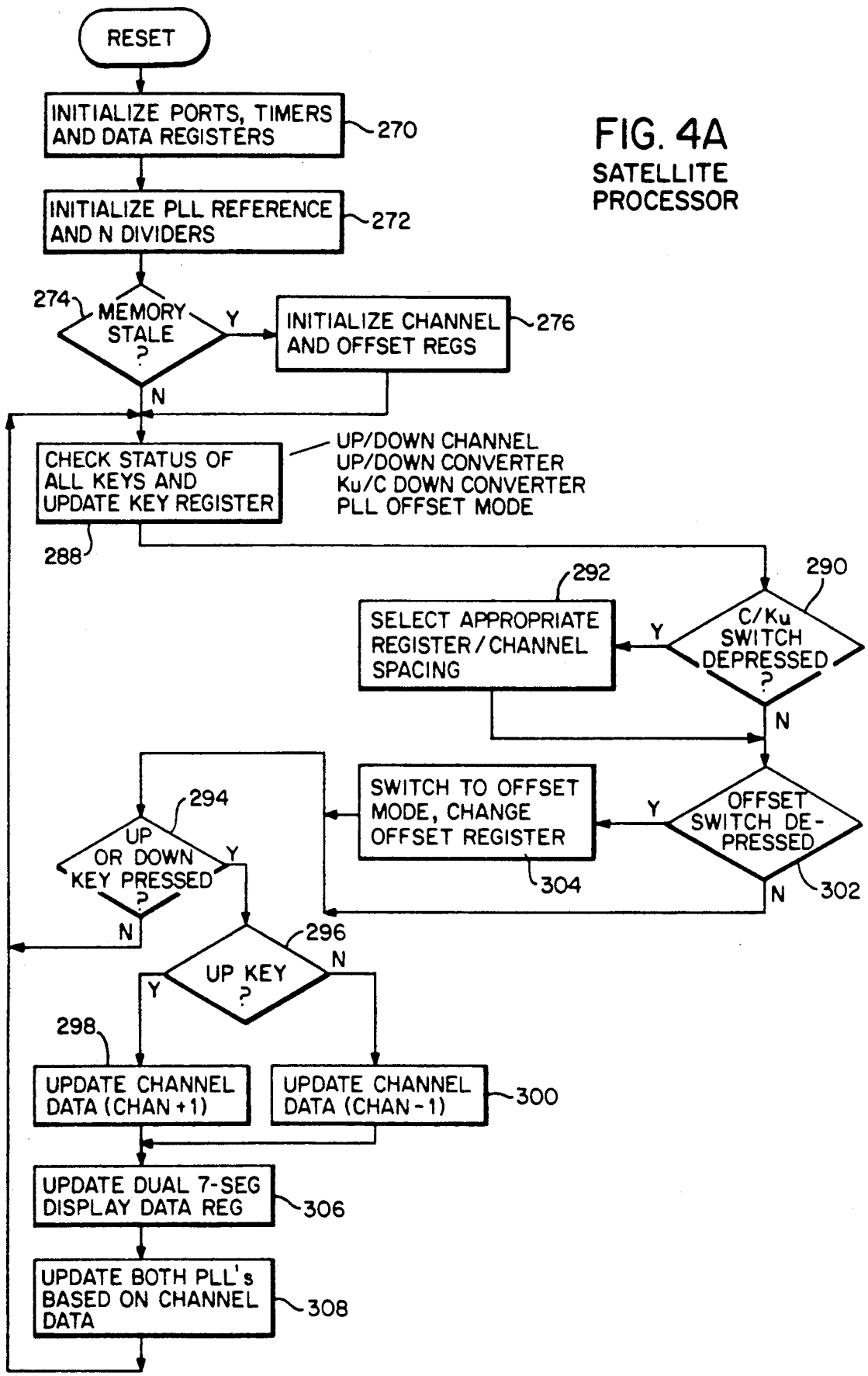
FIGS. 4A-4C are flow charts of exemplary program control steps performed by the satellite transponder processor microprocessor shown in FIG. 3.

FIG. 4A is a flowchart of exemplary program control steps performed by satellite transponder microcomputer 206 shown in FIG. 3. Upon power on reset of microcomputer 206, the microcomputer first initializes all ports, timers and data registers in a conventional manner (block 270) and then initializes the registers within PLL chips 226,248 by writing data to those chips (block 272). The data formats expected by chips 226,248 are conventional and available to those skilled in the art from the manufacturer's data sheets describing the MC145145 PLL chip.

Microcomputer 206 then determines whether its memory is "stale" (decision block 274) (i.e., whether its internal memory contents are invalid such as upon initial installation or power up), and if it is, initializes certain channels and offset registers to default values (block 276).

Figure 4B:
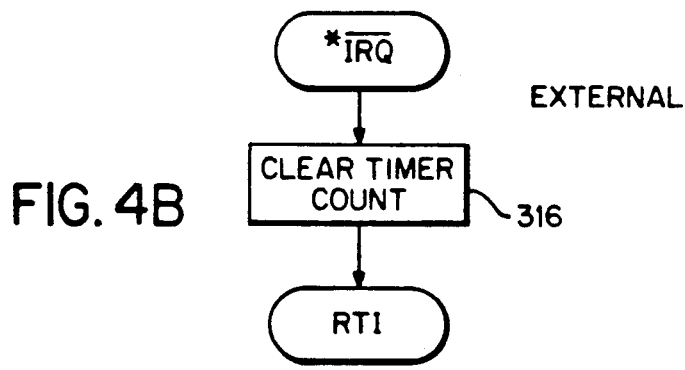
Figure 4C:
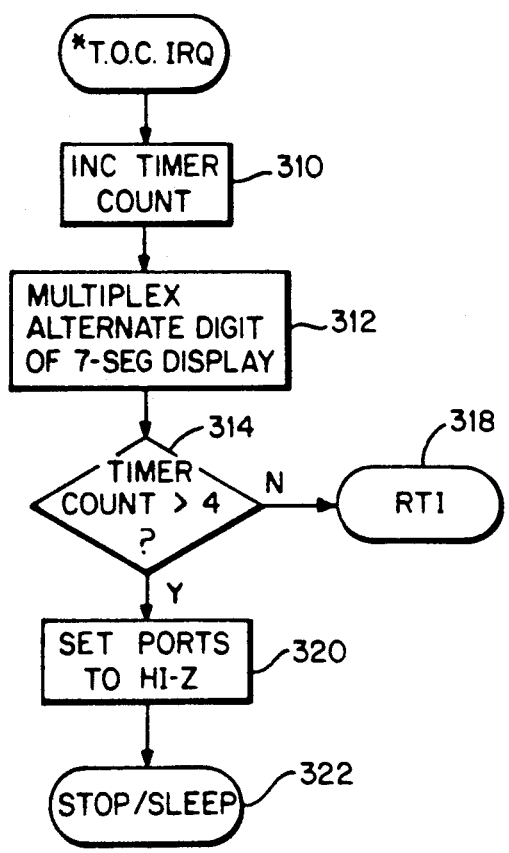
Figure 4D:
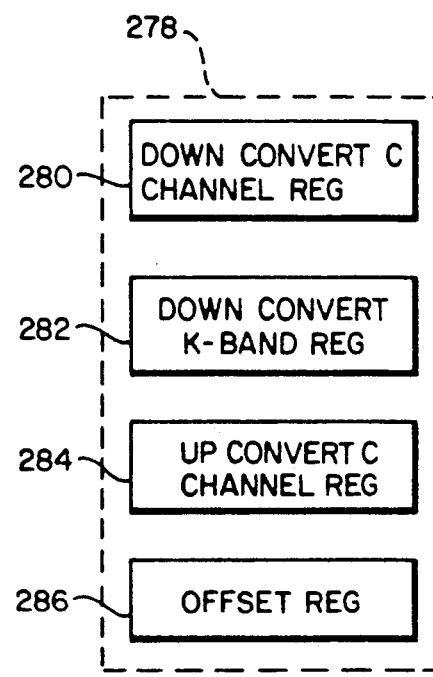
FIG. 4D is a schematic block diagram of some of the parameters stored by the FIG. 3 satellite transponder microprocessor in its internal memory.

In the preferred embodiment, microcomputer 206 maintains at least four user-programmable internal registers within a non-volatile memory 278 shown in FIG. 4D. These internal registers include a down convert channel register for C-band operation 280, a down convert register for K-band operation 282, an up convert channel register 284, and an offset register 286. In the preferred embodiment, satellite transponder processor 112 is capable of down converting either C-band signals or Ku-band signals (provided in the preferred embodiment that both the C-band and the $K_u$-band signals are first down converted to the intermediate 950-1450 MHz band at the antenna by an LNB as is conventional practice).

As mentioned previously, the C-band and $K_u$-bands transponder signals are generally identical in format, mode and bandwidth. However, while the C-band transponder signals are located on standardized center frequencies, $K_u$-band signals typically have non-standard channel spacings and channel center frequencies. Therefore, while C-band transponder signal selection ideally requires a down converter local oscillator frequency resolution of only 20 MHz steps, Ku-band transponder signal selection requires a much finer frequency control (e.g., on the order of 1 MHz resolution). However, the preferred embodiment provides 1 MHz frequency steps for both K-band and C-band channel selection, this additional frequency resolution being provided for C-band signals in order to permit "fine-tuning" to prevent IF clipping from occurring due to transponder signal center frequency errors. Not all satellite transponder signals are what they are supposed to be, these errors in center frequency arising from at least two factors: frequency errors in the satellite transponder itself; and frequency errors generated by the low noise amplifier block converter (LNB) located at each of antennas 102. As described, intermediate frequency amplifier strip 202 shown in FIG. 3 has a very tight bandpass so as to reject all but a single selected transponder signal. Thus, unless the selected transponder signal is located exactly within the center of the bandpass of IF strip 202, the IF strip will tend to clip some of the components of the selected transponder signal—degrading signal quality. In accordance with an important feature of the present invention, satellite transponder processors 112 provide "fine tuning" of the down conversion process performed by down converter 200 for C-band signals to prevent IF stage clipping while also correcting errors in transponder signal center frequencies (so that all distributed transponder signals have standard and correct center frequencies).

In the preferred embodiment, switch selector 208 of satellite transponder processor 112 has four two-position buttons: a C/$K_u$ bandswitch; an up/down frequency switch; an up channel/down channel selector switch; and a normal/offset switch. The positions of these switches are read by the microcomputer at FIG. 4A block 288 and the microcomputer then updates registers 280-286 shown in FIG. 4D in response to switch position changes. The up/down converter switch in conjunction with the bandswitch select which of registers 280-284 are updated in response to depression of the up channel/down channel switch. If the C-band is selected by the bandswitch and the up/down convert switch selects the down-convert position, depression of the up channel/down channel switch will cause the contents of down convert C-band channel register 286 to change. In the preferred embodiment, contents of this register correspond to the C-band input signal transponder selected by the transponder processor 112. Register 286 thus contains a value between 1 and 24 corresponding to the twenty-four possible C-band transponder center frequencies of a given polarity. If the up/down convert switch is in the down convert position and the bandswitch selects the $K_u$-band, then depression of the up channel/down channel switch changes the value of down convert K-band channel register 282 in 10-MHz step channel increments (corresponding in the preferred embodiment to 1-48 $K_u$-band "channels").

Referring once again to FIG. 4A, the register selection process described above is performed by decision block 290, block 292, and updating of the contents of registers 280.282 is performed by decision blocks 294,296 and blocks 298,300.

If the satellite transponder processor 112 offset/normal switch is in the "offset" position (as tested for by decision block 302), the satellite transponder processor switches to offset mode and changes the contents of offset register 286 in 1-MHz steps (plus or minus 9 MHz total) in response to depression of the up channel/down channel switch (block 304).

Finally, if the up/down convert switch selects the up convert position, depression of the up channel/down channel switch alters the contents of the up convert C-band channel register 284 to select the output transponder frequency of satellite transponder processor 112. In the preferred embodiment, $K_u$-band and C-band transponder signals are both up-converted onto standard center frequencies within the 900-1500 MHz down-converted band compatible with virtually all conventional satellite receivers—preferably (but not necessarily) of a given polarity to provide uniform 40-MHz channel spacing.

After each depression of the up channel/down channel switch, microcomputer 206 writes the updated contents of registers 280-286—after appropriate calculations are performed to convert the register contents into "divide-by-n" values—to PLL chips 236,248. Specifically, microcomputer 206 converts the contents of one of registers 280,282 and the contents of offset register 286 to a first value and writes that value to the down converter PLL chip 226; and converts the up convert channel register 284 to another value which it writes to the up converter PLL chip 248. The following exemplary functions described the data conversion process performed by block 308 assuming a 612 MHz if frequency:

For C-band down convert:

PLL 226 divisor value=((CChan−1)*CINC)+CO1 where Cϕ1=2042,

CChan=1-24 (contents of Reg. 280), and

CINC= −2ϕ (corresponding to 20 MHz decrements)

For Ku-band down converter, PLL 226 divisor value=((KuChan−1)*KuINC)+KuO1 where Kuϕ1=1577, KuChan-1-48 (contents of Reg. 282), and KuINC=10ϕ (corresponding to 10 MHz increments)

For up converter control,

PLL 224 divisor value=((CChan−1)*CINC).Cϕ1 where Cϕ1=2042,

CChan=1-24 (contents of Reg. 284), and

CINC= −2ϕ

Once registers 280-286 have been updated as described and the corresponding divide-by-N PLL chip divisor values have been calculated and written to PLL chips 226, 248, display 210 is also updated (block 306) with the appropriate information just inputted. For cost reasons, the preferred embodiment includes only a double-digit 7-segment display device for display 210 and therefore the display is capable of displaying only a single two-digit value at a time. Thus, display 210 displays the down-convert channel when the up/down convert switch is in the down convert position, displays the up-convert channel number when that switch is in the up-convert position, and displays the current offset increment whenever the offset/normal switch is switched to the "offset" position.

FIGS. 4B and 4C are flowcharts of exemplary program control steps performed by satellite transponder processor microcomputer 206 under interrupt control. As will be understood by those skilled in this art, the FIG. 4C interrupt routine is performed periodically (e.g., every 8.33 ms in the preferred embodiment) in response to internally-generated timer signals. The FIG. 4C interrupt routine increments a count (block 310) and then multiplexes an alternate digit to the 7-segment display 210 (block 312). In the preferred embodiment, only enough data lines to drive a single digit of the 2-digit display 210 are provided between microprocessor 206 and the display, with dual digit control being provided by simply periodically alternating the data lines between the display segments. A decision 314 then determines whether the timer count incremented by block 310 exceeds the value of 4. Referring briefly to FIG. 4B, the external interrupt routine shown in that figure is also performed periodically and results in clearing of the timer count whenever the power loss detector 252 shown in FIG. 3 detects that power is still present (block 316). Referring once again to FIG. 4C, if the timer count does not exceeds the value of 4 in the preferred embodiment (indicating that the FIG. 4B routine recently has cleared the timer count), a return from interrupt is performed (block 318). On the other hand, if decision block 314 determines that the FIG. 4B routine has not recently cleared the timer count (indicating that power loss detector 252 has has detected a power loss), the FIG. 4C interrupt routine prepares the microcomputer 206 for a power loss by setting all I/O ports to their high impedance states (block 320) and controlling the microcomputer to "go to sleep" so as to minimize current draw (block 322). In this sleep state, data retention circuit 254 shown in FIG. 3 (which in the preferred embodiment is "super cap"—that is, a capacitor of high capacitance but of small physical size) has sufficient current storage capabilities to maintain the contents of the microcomputer memory non-volatile for a relatively long period of time (e.g., a week) until power is restored.

Figure 5:
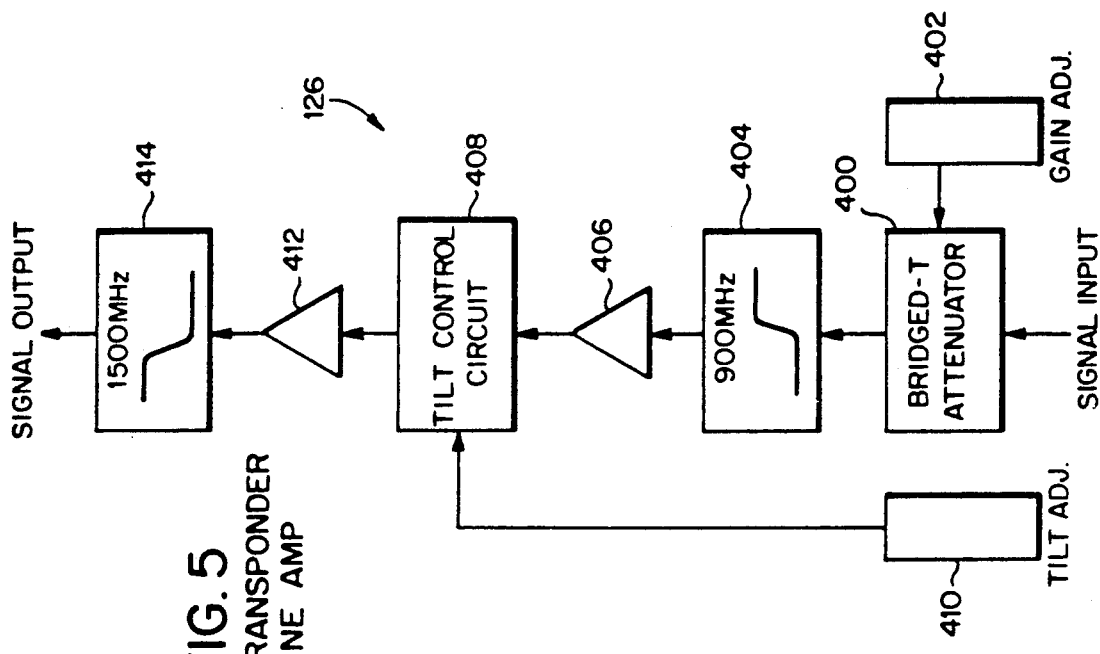
FIG. 5 is a schematic block diagram of an exemplary transponder line amplifier shown in FIG. 1B.

FIG. 5 is a schematic block diagram of an exemplary line amplifier 126 shown in FIG. 1B. As previously mentioned, line amplifiers 126 maintain sufficient signal levels throughout distribution network 124 so that each subscriber is provided with adequate signal levels to result in full quieting or limiting of his satellite receiver 136. In the preferred embodiment, each line amp 126 includes a bridged-T attenuator 400 the gain of which is adjusted by an adjustable gain control 402. The output of attenuator 400 is high-pass filtered by a 900 MHz high-pass filter 404 and buffered by a conventional buffer 406 before being applied to the input of a tilt control circuit 408. Tilt control circuit 408 in the preferred embodiment provides a desired frequency response to compensate for the relatively high loss the coaxial cable introduces for high frequencies as compared with low frequencies. The output of tilt control circuit 408 is applied to the input of a further buffer 412 before being low-pass filtered by 1500 MHz low-pass filter 414. Line amplifiers 126 may be spaced along the cable as desired so as to provide sufficient signal levels over long runs within distribution network 124.

Figure 5A:
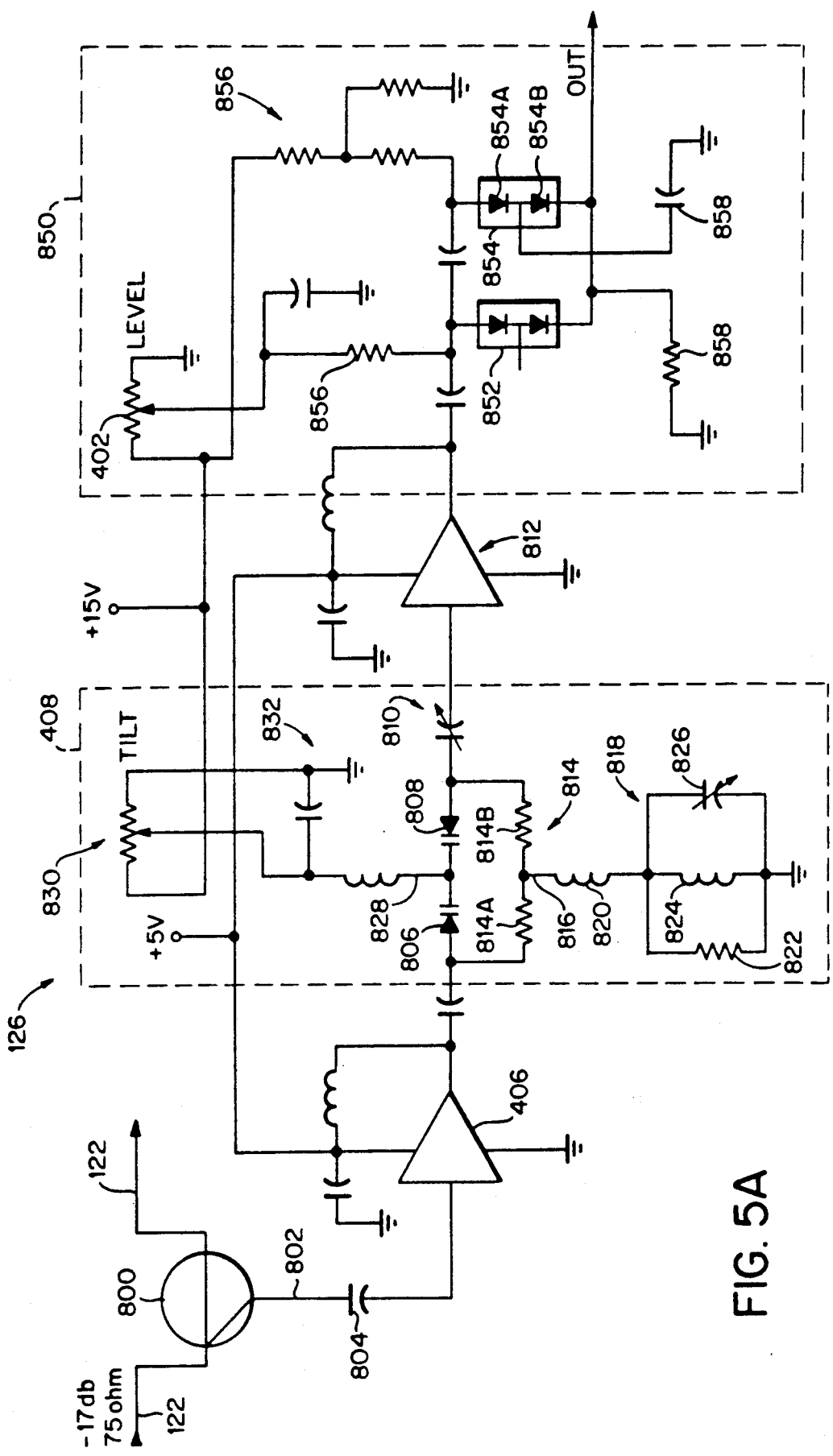
FIG. 5A is a detailed schematic diagram of the line amplifier shown in FIG. 5.

FIG. 5A is a detailed schematic diagram of an exemplary configuration for amplifier 126 coupled to a conventional directional coupler in the preferred embodiment. As is well known to those familiar with the technical aspects of cable television, there are several types of amplifiers commonly used within a cable television distribution system some of which are: bridge amplifiers and trunk amplifiers. A bridge amplifier taps some of the energy (e.g., at −17 dB level) from the cable and amplifies it for application to a new line (e.g., at each floor of a condo complex, a bridge amp might be used to obtain signal from a "main" line and apply the signal to a line routed to different condos on that floor). Trunk amplifiers are connected "in line" of a cable and are used to compensate for cable losses by amplifying the signal so the signal reaches its destination at an appropriate level.

The circuit shown in FIG. 5A is a bridge amplifier, although the same circuit minus the input signal directional coupler 800 can also be used as a line amplifier. Directional coupler 800 "taps off" (samples) the incoming line (e.g., at a −17 dB level) and provides a sampled signal level on line 802. The isolation provided by directional coupler 800 not only prevents too much energy from being removed from the cable 122 by amplifier 126, but also prevents noise and other signals that may be generated by amplifier 126 (or that may be present on the cable to which the output of amplifier 126 is connected) from finding their way back onto cable 122.

The sampled output of coupler 800 is capacitively coupled (via a capacitor 804) to the input of an amplifier stage 406. In the preferred embodiment, amplifier stage 406 comprises a packaged monolithic microwave IC part no. UPC1677 manufactured by NEC (which provides 50 ohm input impedance, 50 ohms output impedance, and a substantially flat frequency response of 10 MHz to 1750 MHz with a current draw of only 90 milliamps). The capacitor and choke (inductor) are provided in the amplifier 406 circuit per the specifications provided by NEC.

The output of amplifier 406 is applied to the input of tilt control block 408 in the preferred embodiment. As mentioned previously, coaxial cable 122 has higher loss factors for higher frequencies. Therefore, if signals in the range of 900–1500 MHz are applied to the input of a coaxial cable at constant signal amplitudes across that frequency range, the signals near 1500 MHz will suffer more attenuation by the time they reach the other end of the cable than will the signals near 900 MHz. Tilt control block 408 "tilts" the frequency response of the signals amplified by amplifier 406 so that signals of higher frequencies within the range are amplified more than are signals of lower frequencies within the range. Thus, in the preferred embodiment the output of amplifier 126 has substantially constant amplitude across the 900–1500 MHz range despite the frequency selective line loss introduced by cable 122.

More particularly in the preferred embodiment, the signal provided by amplifier stage 406 is capacitively coupled to the anode of a varactor diode 806. The cathode of diode 806 is connected to the cathode of a further varactor diode 808. The anode of the further varactor diode 808 is connected to a variable capacitor 810 which capacitively couples the signal at the varactor diode 808 anode to an amplifier stage 812 (this latter amplifier stage also including a UPC1677 in the preferred embodiment). A two-resistor voltage divider 814 is connected between the anode of varactor diode 806 and the anode of varactor diode 808. The junction 816 of the two resistors 814a, 814b within voltage divider 814 is connected to ground potential through a reactance circuit 818 including a lump inductance 820 connected in series with parallel-connected resistor 822, inductance 824 and variable capacitance 826. The junction 828 of the cathodes of varactor diodes 806, 808 is connected to an adjustable DC voltage source 830 (a potentiometer in the preferred embodiment) through an RF choke/capacitor decoupling network 832.

The adjustable voltage provided by source 830 controls the amount of reverse bias across the varactors 806, 808. As is well known, the capacitance across a varactor diode is inversely proportional to the amount of reverse bias across the diode junction. Thus, increasing the voltage applied to junction 828 decreases the capacitance across both of varactors 806, 808, while decreasing the voltage applied to the junction increases the capacitances provided by the varactors. The resulting change in frequency response of components 806-832 (which together function as an an adjustable high-pass filter) provides a greater or lesser degree of roll-off of low-frequency signals. The preferred embodiment employs two varactor diodes 806, 808 connected in a symmetrical configuration to obtain the necessary small amount of adjustable capacitance range (each varactor diode has a minimum capacitance of about 1.5 pF in the preferred embodiment, whereas the capacitance required at the 900 MHz to 1500 MHz frequencies is on the order of less than 1 pF).

Potentiometer 830 may be adjusted after line amplifier 126 is actually installed to provide a constant output level at the output "OUT" of the line amp upon input of a frequency-swept signal to a remote end of coaxial cable 122—thereby compensating for high frequency loss actually introduced by the cable. In applications in which standard length coaxial cable runs are provided between line amps 126, the line amp can be "set up" beforehand to compensate for the average high frequency roll-off introduced by such a standard length run. Thus, line amp 126 provides a simple adjustment to compensate for the frequency response of coaxial cable 122—such that the frequency response of the line amp 126 by itself is not "flat" but the frequency response of the line amp in conjunction with a predetermined length run of coaxial cable 122 is substantially "flat" or uniform over the frequency range of 900 MHz to 1500 MHz. Variable capacitor 810 is adjusted to help further "flatten" the frequency response of the line amp 126/coaxial cable combination (since the low-frequency rolloff provided by varactors 806, 808 and associated components 814-826 in conjunction with the high-frequency rolloff introduced by the coaxial cable 122 may exhibit a "bow" in about the center of the frequency range).

Level adjusting block 850 in the preferred embodiment includes a two pairs 852, 854 of series-connected PIN diodes acting as adjustable RF signal attenuators. As is well known, increasing the current flowing through a PIN diode decreases the attentuation the diode introduces to RF signals. A variable DC voltage produced at the wiper of potentiometer 402 is applied through a current limiting resistor 856 to cascaded PIN diodes 852. Also applied to these PIN diodes 852 is the capacitively decoupled RF output signal produced at the output of amplifier 812. The RF output of PIN diodes 852 is provided at the "OUT" terminal of line amp 126—the PIN diodes 852 introducing an adjustable amount of attenuation to the RF signal corresponding to the DC level provided by potentiometer 402.

PIN diodes 854, a voltage divider 856, and a further resistor 858 constitute an impedance matching network. As the attenuation across PIN diodes 852 changes in response to adjustment of "level" potentiometer 402, the impedance "looking into" the line amp 126 output terminal "OUT" likewise changes. Components 854, 856, 858 compensate for this impedance change at the output terminal "OUT" by providing an inverse impedance change indirectly responsive to the adjustment of the level potentiometer 402. Specifically, a fixed voltage level (Vcc=15VDC in the preferred embodiment) is applied to the anode of the first of two cascaded PIN diodes 854A. The cathode of the second PIN diode 854B is connected to the "OUT" terminal and is also connected to ground potential through series-connected resistor 858. Resistor 858 carries the current flowing through PIN diodes 852 to ground potential. Thus, the voltage drop across diodes 854 decreases as the voltage drop across diodes 852 increases, and vice versa. The exact voltage drop across diodes 854 depends on the resistances within voltage divider network 856 (which in turn are selected based on the characteristics of the PIN diodes 854 and upon the impedance desired to be presented at the output of line amp 126). Capacitor 858 provides an RF short to ground, making the RF output impedance of line amp 126 a function of the attenuation introduced by PIN diode 854B.

Figure 6:
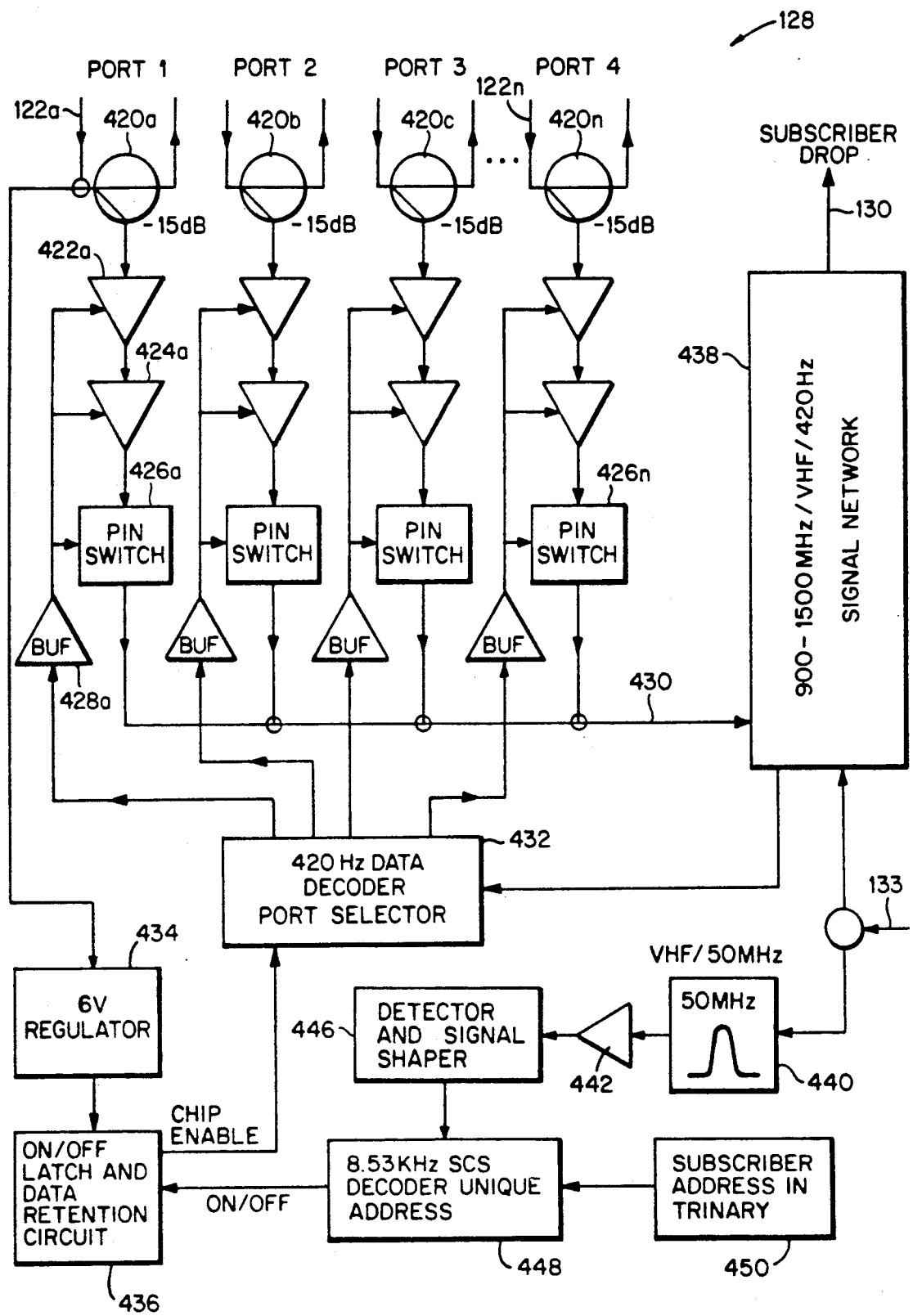
FIG. 6 is a schematic block diagram of the 4-port addressable cable selector shown in FIG. 1B.

FIG. 6 is a schematic block diagram of 4-port addressable cable selector 128 in the preferred embodiment (one of the main functions of which is to multiplex cables 122 onto subscriber single drop cable 130). Each of the plurality of cables 122 of network 124 passes through a conventional unidirectional coupler 420 which samples the signal present on the cable (at 15 dB down) and provides the sampled output to cascaded buffers 422,424. The output of the buffers 422,424 is provided to the input of a PIN switch 426 which passes or does not pass the buffer outputs onto a common bus line 430 in response to a buffered control signal obtained from a buffer 428. A data decoder/port selector 432 provides a plurality of outputs only one of which is active at any given time—thus insuring that only one of PIN switches 426 is "on" at at time. PIN switches 426 under control of data decoder/port selector 432 thus provides a multiplexing function which permits only one of the plurality of cables 122 to apply their respective transponder signal blocks to common bus 430.

Power for cable selector 128 is obtained from power inserter 120 shown in FIG. 1A via one of the plurality of cables 122 in a 6-volt regulator 434 of conventional design. The conventional single bit latch 436 provides a chip enable input to data decoder/port selector 432 which acts to either enable or disable this port selector. In the preferred embodiment, port selector 432 comprises a conventional trinary type integrated circuit manufactured by Motorola (e.g., Part No. MC145026) receiving a conventional trinary data signal from signal network 438, and decoding that signal into one of n outputs for controlling respective PIN switches 426a-426n. This conventional port selector chip 432 when disabled by latch 436 turns "off" all of PIN switches 426—thus disabling subscriber service. To provide remote activation/deactivation of subscriber service, control signals provided by subscriber control system block 144 shown in FIG. 1B via VHF line 133 are filtered by a 50 MHz filter 440, buffered and shaped by a buffer 442 and associated detector and signal shaper 446, and then applied to an 8.3 kilohertz trinary decoder 448.

A predetermined unique subscriber address is preprogrammed into each cable selector 128 beforehand (using, e.g., DIP switch 450, hard-wired jumpers, or similar). The received address signal is decoded by decoder 448 and compared with the preprogrammed subscriber address provided by block 450. If the two addresses match, an output is generated by block 448 corresponding to an encoded "on/off" state provided by the control signals originating from the subscriber control system 144, this on/off state determining the new state of on/off latch 436. In this way, the service of individual subscribers can be turned on and off at will from a remote location and full subscriber addressability is provided using low-cost, reliable components. Moreover, the possibility of tampering is minimized because (as mentioned previously) the 4-port addressable cable selector 128 is typically located in the wire chase and is therefore generally inaccessible to the individual corresponding subscriber.

Figure 6A:
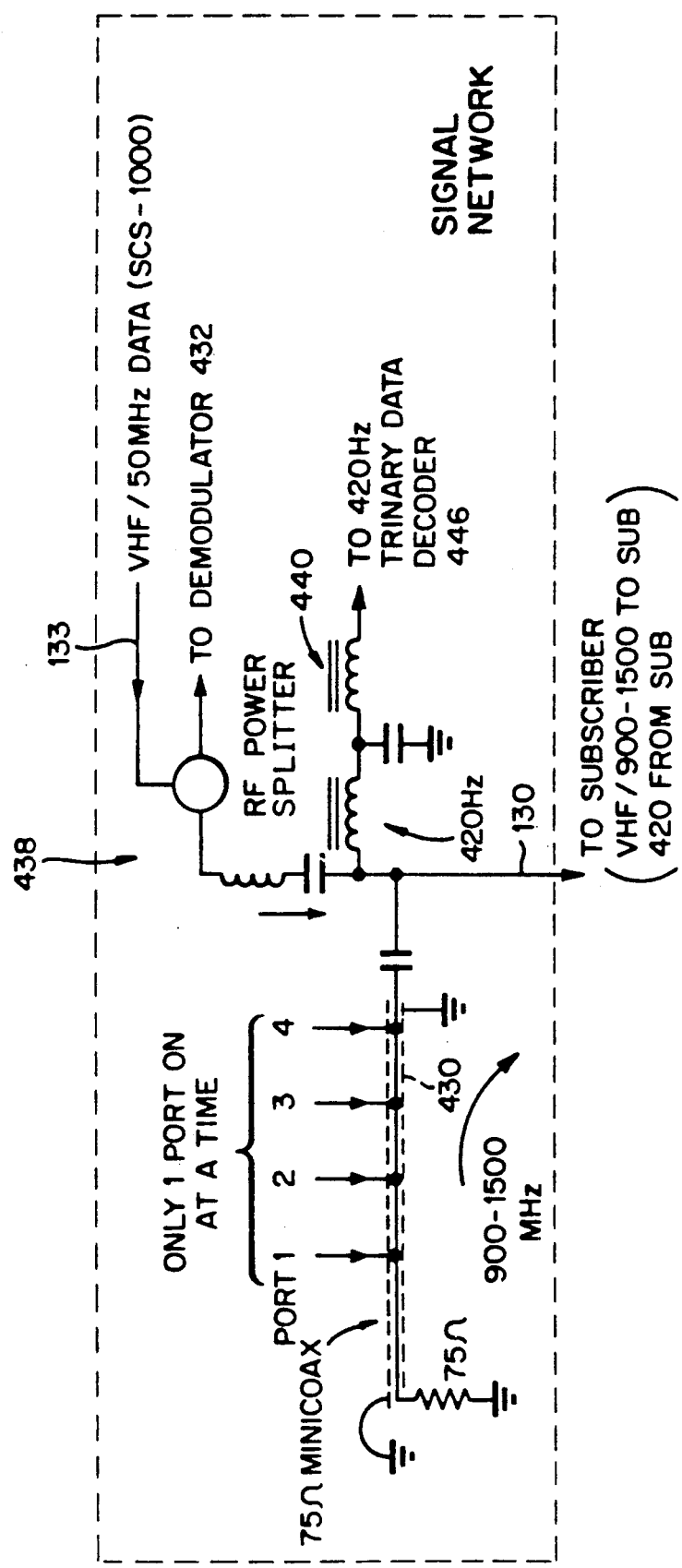
FIG. 6A is a detailed schematic diagram of the cable selector signal network shown in FIG. 6.

FIG. 6A is a schematic diagram of the signal network 438 shown in FIG. 6. As can be seen in FIG. 6A, common bus 430 is simply a 75 Ohm mini-coax line terminated by a 75 ohm resistor, this line being capacitively coupled to subscriber drop cable 130. PIN diode switches 426 shown in FIG. 6 maintain relatively high impedance (e.g., 2500 ohms) except when they are on. Further on/off isolation is provided by switching $V_{cc}$ power on/off to amplifiers 422a,424a. In some configurations only one of amplifiers 422a,424a may be required.

Figure 7A:
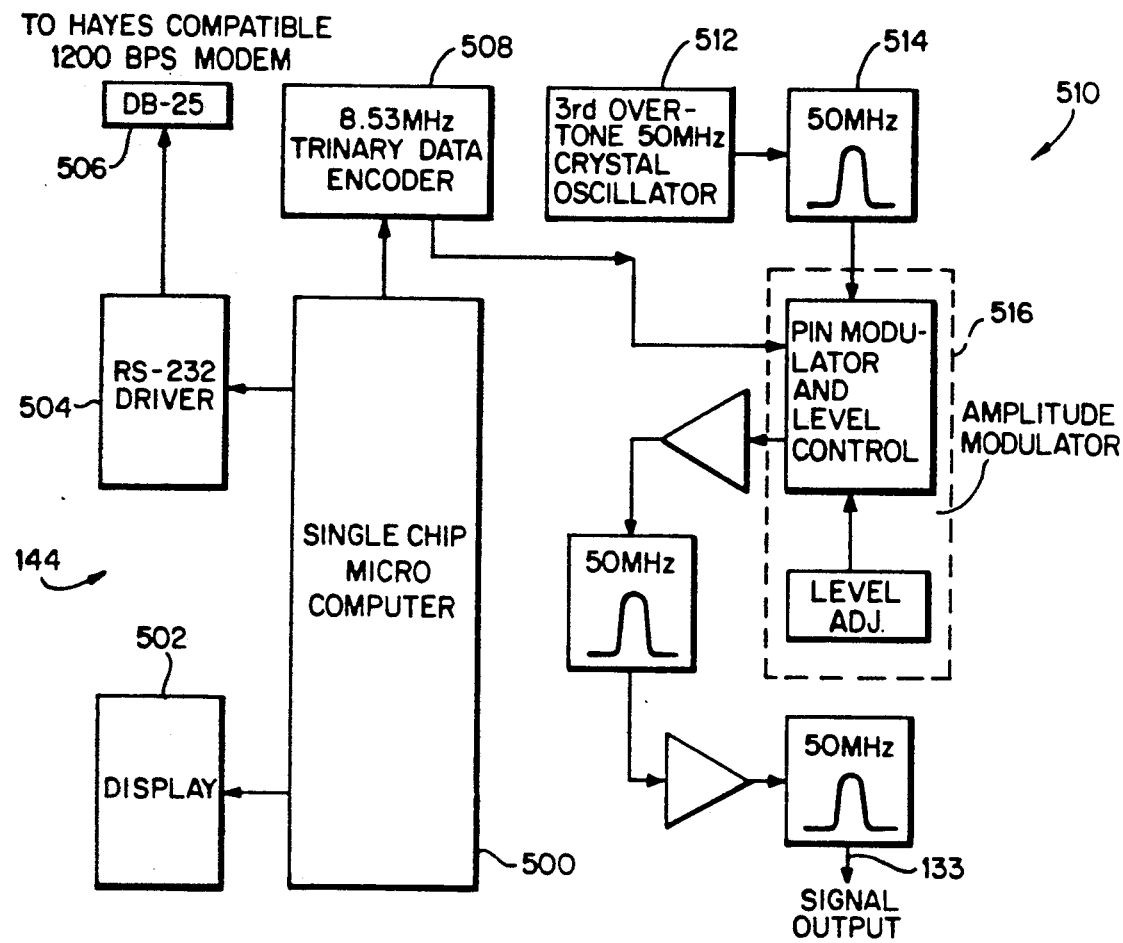
FIG. 7A is a detailed schematic diagram of the subscriber control system amplitude modulator shown in FIG. 7.
Figure 7A:
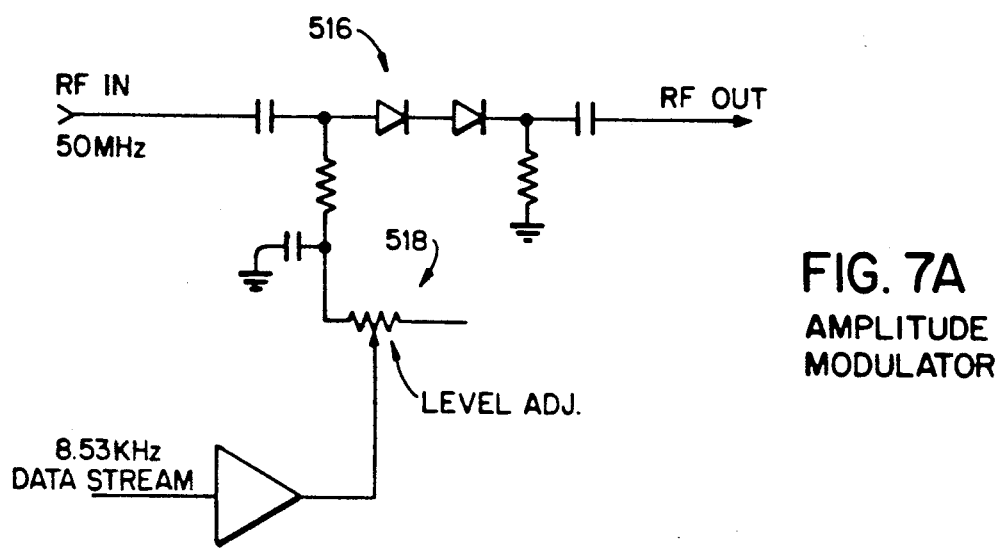

As mentioned above in connection with FIG. 6, subscriber control system 144 is capable of controlling individual cable selectors 128 to turn subscriber service on and off on a subscriber-by-subscriber basis. FIG. 7 is a block diagram of subscriber control system 144 in accordance with the presently preferred exemplary embodiment of the present invention. Subscriber control system 144 includes a single chip microcomputer 500, a display 502, an RS-232 driver 504 coupled to conventional Hayes compatible dial-up 1200 baud modem 506, a conventional 8.35 MHz trinary date encoder 508, and a simple but effective AM transmitter 510. Subscriber control system 144 may be contacted over dial-up lines from a remote location by, for example, an IBM personal computer or compatible operating under appropriate communications software. Signals are passed over the telephone line via modem 506 and RS-232 driver 504 to single chip microcomputer 500 specifying, e.g., subscriber address and new state (on or off). In response to receipt of such data, single chip microcomputer 500 provides subscriber address/state data to data encoder 508 which converts this data into trinary form in a conventional manner and applies the converted encoded data to AM transmitter 510. AM transmitter 510 in the preferred embodiment includes a third overtone 50 MHz crystal oscillator 512 bandpass filtered by a conventional 50-MHz bandpass filter 514 to provide a stable carrier frequency of on the order of 50 MHz. Carrier frequency is applied to a PIN diode based amplitude modulator 516, a more detailed schematic diagram of which is shown in FIG. 7A. Amplitude modulator 516 simply applies the buffered encoded data stream obtained from data encoder 508 through an adjustable attenuator 518 to the anode of the PIN diode (this diode anode also being capacitively coupled to the output of the 50 MHz bandpass filter 514). The resulting RF output signal produced by amplifier modulator 516 consists of a pulse-modulated continuous wave 50 MHz signal, as will be appreciated by those of ordinary skill in this art. This pulse-modulated CW signal is further buffered and filtered and applied to VHF line 133 for application to 4-port addressable cable selectors 128.

Figure 8:
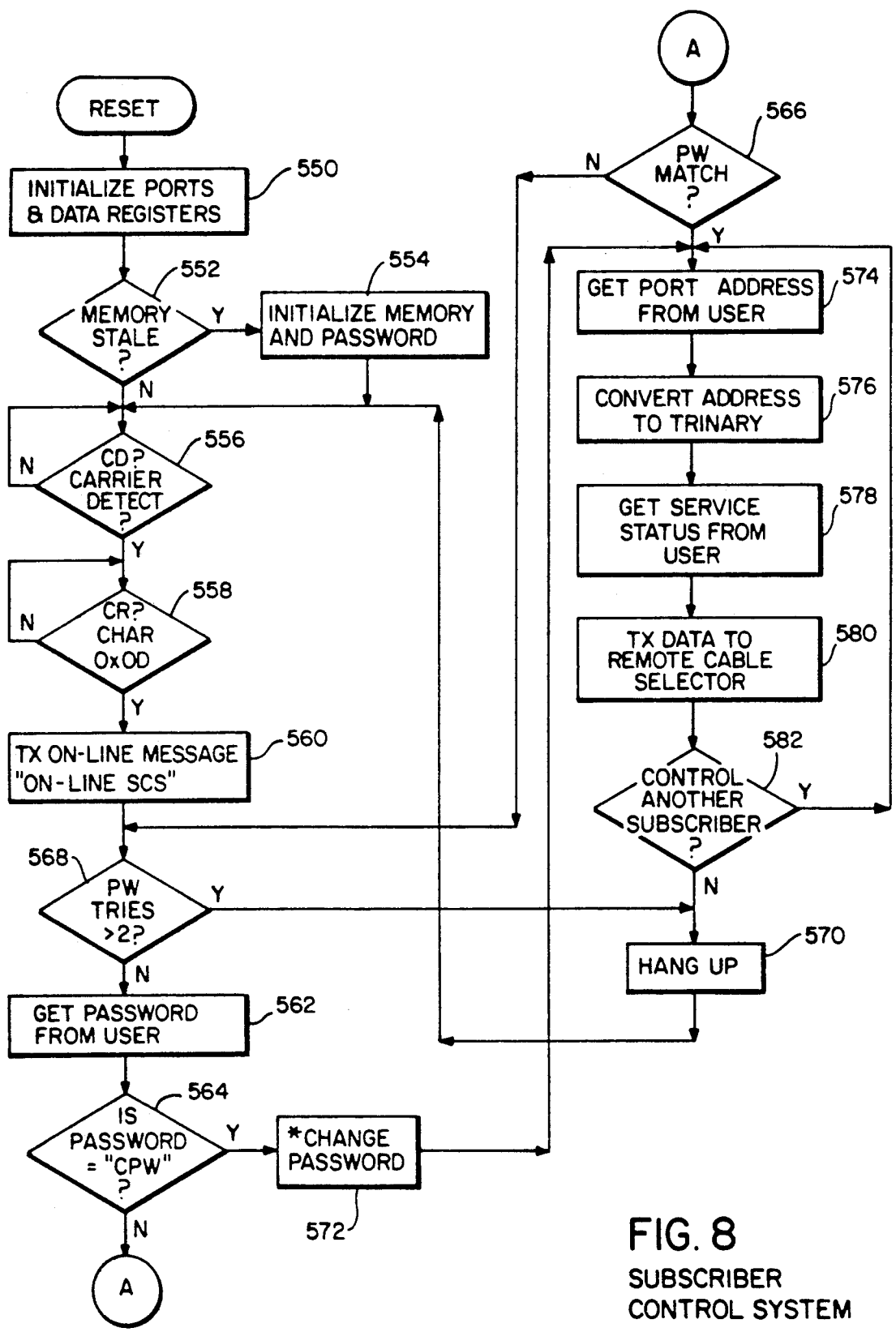
FIG. 8 is a schematic flow chart of exemplary program control steps performed by the subscriber control system microcomputer shown in FIG. 7.

FIG. 8 is a schematic flow chart of exemplary program control steps performed by the subscriber control system single chip microcomputer 500 shown in FIG. 7. Upon initial power-up, microcomputer 500 first initializes ports and data registers (block 550) and then determines whether its memory is "stale" (decision block 552)—meaning that its memory contents are invalid or were never initialized and that default values should be used. In the preferred embodiment, microcomputer 500 includes an internal preprogrammed read only memory which contains a default "override" password. Access to subscriber control system 144 is protected by password in order to prevent unauthorized tampering with subscriber service. If the microcomputer memory is found to be stale (as tested for by decision block 552) a password register within the microcomputer is initialized with the default password and other memory variables are also initialized according to internally stored defaults (block 554). Otherwise, microcomputer 500 waits until it detects a carrier from RS-232 driver 504 (indicating that modem 506 has been contacted) (decision block 556). Once carrier is detected, microcomputer 500 waits for a carriage return (decision block 558) and then transmits a message to the calling station over modem 506 indicating that the calling station has contacted the subscriber system (block 560). Microcomputer 500 then obtains a password from the user (block 562) and determines whether the password stream indicates that the calling user wishes to change passwords (decision block 564). If a password change is not being requested, then microcomputer 500 determines whether the transmitted password matches the previously initialized password (decision block 566). If the password does not match, the user is given another try (decision block 568) to enter the correct password. If the user fails twice to enter the correct password, microcomputer 500 hangs up the modem and terminates the call (block 570). If a password change is requested, on the other hand, microcomputer 500 prompts the user for the current password and also prompts the user twice for the new password before changing the password from the previously initialized password to the new user specified password (block 572).

Once the user has cleared password security, single chip microcomputer 500 obtains a subscriber address from the user (block 574) and converts that address into trinary in a conventional manner under software control (block 576). Single chip microcomputer 500 also obtains the new service status (on or off in the preferred embodiment) from the user (block 578) and transmits that data to 4-port addressable cable selector 128 over VHF line 133 as described previously (block 580). Blocks 574–580 may be performed repeatedly for multiple subscribers (as tested for by decision block 582) if the on/off statuses of multiple subscribers are to be altered. When all desired subscriber status changes have been made, single chip microcomputer 500 hangs up modem 506 (block 570) and awaits new carrier detect (decision block 556).

In the preferred embodiment, the following exemplary data format is used for communicating between subscriber control system 144 and 4-port addressable cable selector 128:

| SCS-1000 144→WACS UNIT 128 | | | |
|---|---|---|---|
| 2-word transmission, 9 tri-bits→(same data sent twice for reliability) | | | |
| $D_8$ | $D_7$-$D_1$ | $D_0$ | $D_8$-$D_1$ Sub Address $2 \times 3^7 = 4374$ possible addresses |
| ∅ or 1 Binary | ∅, 1, 2 trinary | ∅-service off or 1-service on | |
| DATA RATE 8.53 KHz = 1066 bps = 118 words/s | | | |

Figure 9:
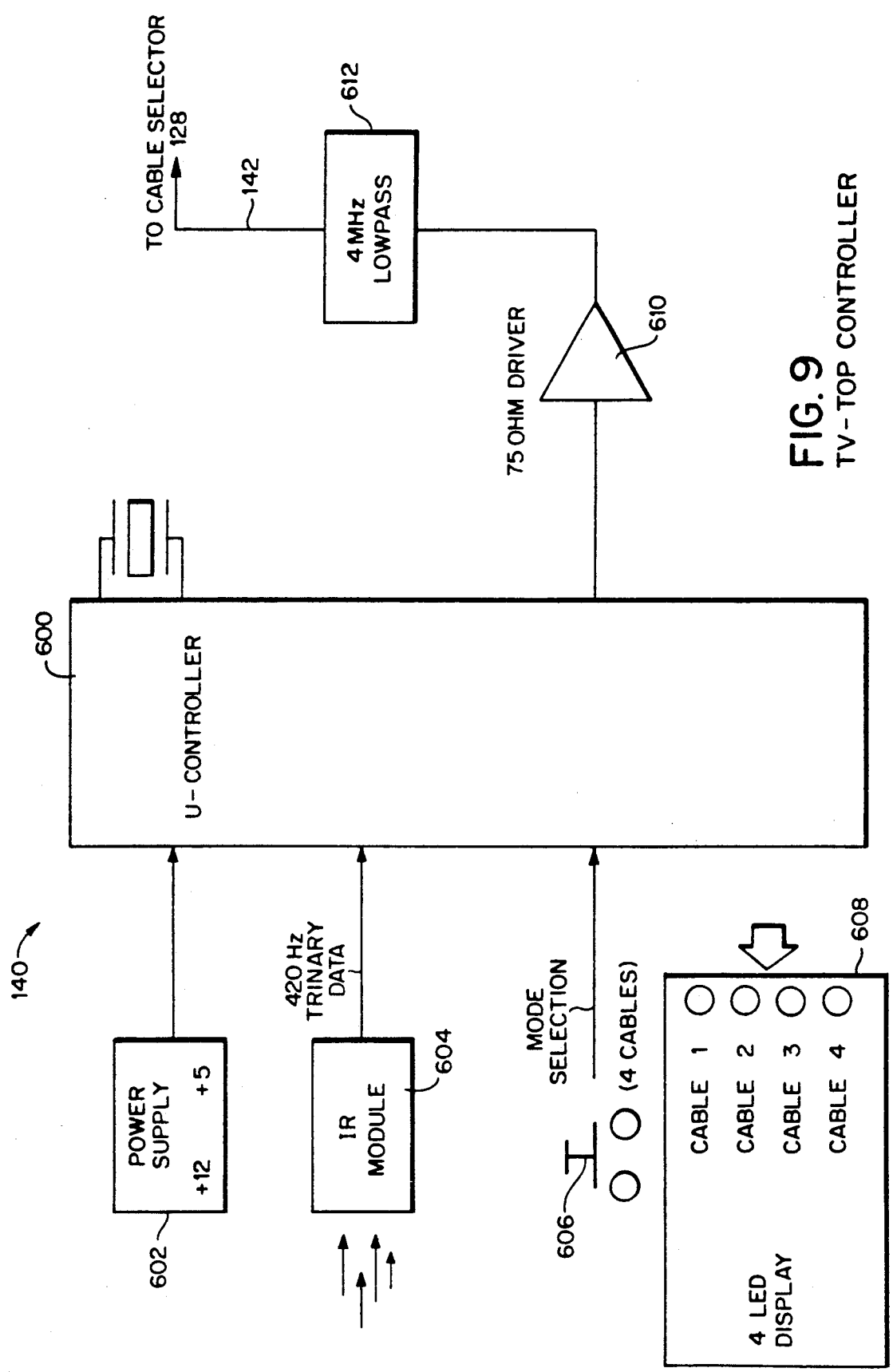
FIG. 9 is a schematic block diagram of the TV-top 4-cable selector unit controller shown in FIG. 1B.

FIG. 9 is a schematic block diagram of the TV-top controller (4-cable selector unit) 140 shown in FIG. 1B. In the preferred embodiment, TV-top controller 140 functions merely to control which of the plurality of cables 122 is selected by the 4-port addressable cable selector 128 associated with the subscriber. The user in the preferred embodiment operates TV-top controller 140 in conjunction with satellite receiver 136 to select a desired transponder television signal for viewing.

TV-top controller 140 in the preferred embodiment includes a conventional microcontroller 600 connected to a conventional power supply 602, a conventional IR (remote control) module 604, a mode selection pushbutton 606, and a 4-LED display 608. Microcontroller 600 generates an output signal which is buffered by a buffer 610, low-pass filtered by a filter 612 and is then applied to a subscriber drop cable 30 via cable 142 shown in FIG. 1B and signal separator 134 for eventual application to the 4-port addressable cable selector 128.

Figure 10B:
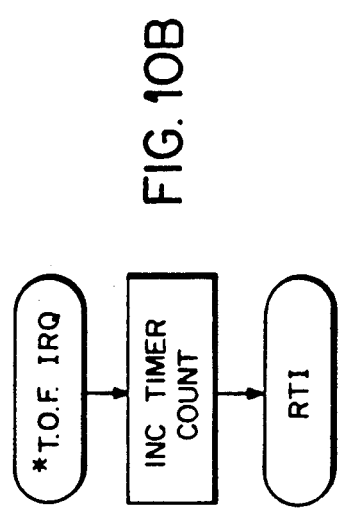
FIGS. 10A and 10B are schematic flow charts of exemplary program control steps performed by the TV-top controller microcontroller shown in FIG. 9.
Figure 10A:
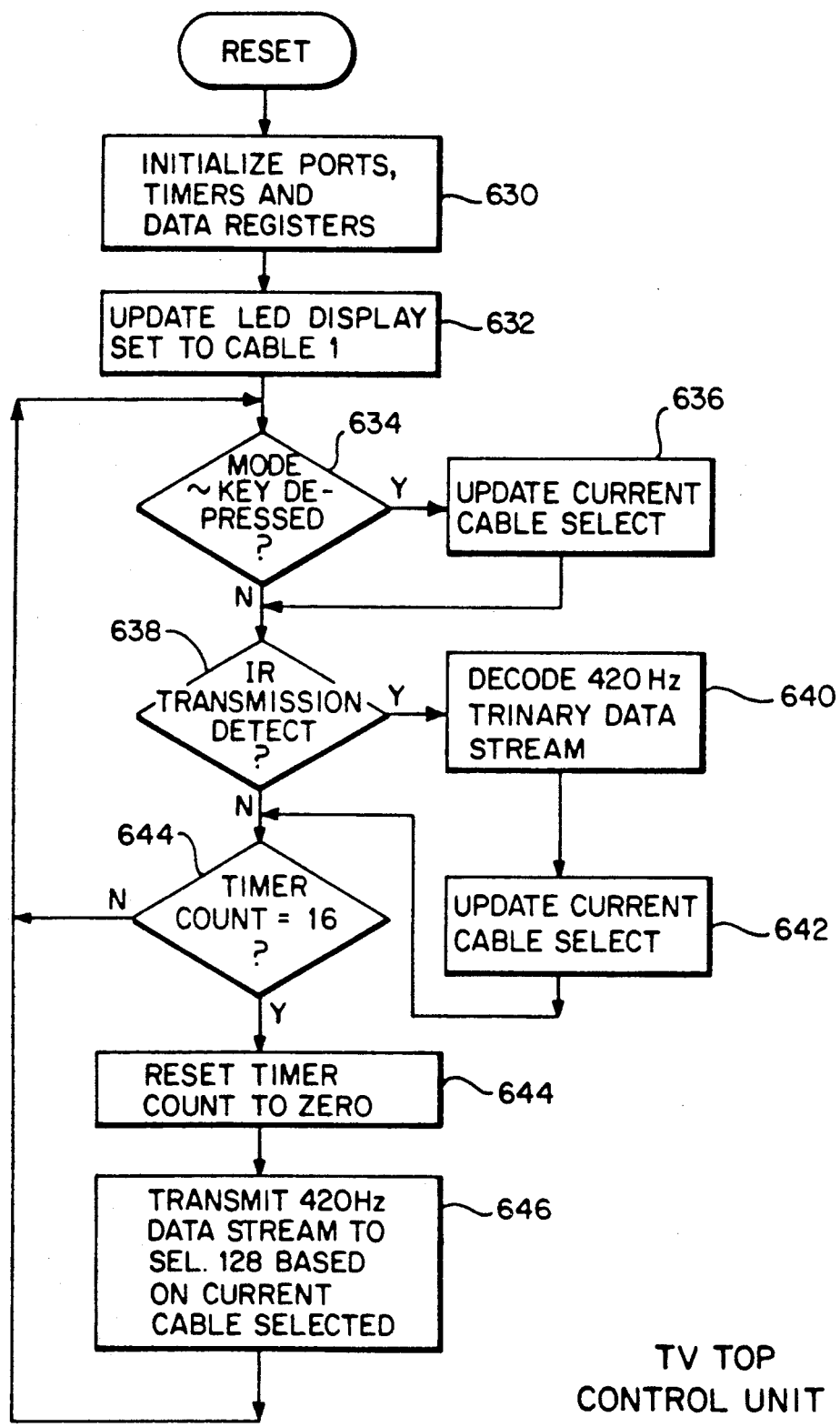

The function and operation of the TV-top controller 140 perhaps may be best understood referring to FIG. 10A, a flowchart of exemplary program control steps performed by microcontroller 600. Upon power on reset of microcontroller 600, the microcontroller initializes all the ports, timers and data registers (block 630) and then updates its 4-LED display 608 to display that cable 1 is active (decision block 632; preferably the microcontroller at this point also transmits control data to addressable cable selector 128 to actually select a "first" of the plurality of cables 122 in a manner that will be explained shortly). Microcontroller 600 then checks for depression of mode selection key 606 (decision block 634). Each depression of mode selection switch 606 advances the one of cables 122 selected by 4-port addressable cable selector 128 by 1 (e.g., so that if the currently selected cable is cable 1 and mode selection button 606 is depressed three times, the new current selection will be cable 4). Microcontroller 600 updates an internally-stored cable value in response to each depression of mode selection switch 606 (block 636).

In addition, IR module 604 (a conventional standard IR receiver/decoder manufactured by Sharp Corporation of Japan) detects transmission of conventional IR trinary data from a handheld remote control unit. If microcontroller 600 determines that IR module 604 has received data from the handheld remote control unit (decision block 638), it decodes the incoming data stream (block 640) and updates the current cable selection in accordance with that data stream (block 642). Decision block 644 then determines whether timer count is equal to or greater than 16. This function can perhaps be best understood in connection with the interrupt routine shown in FIG. 10B, which increments the timer counts periodically. If the timer count does not exceed 16, steps 634-644 are performed continually until the timer count does equal or exceed the value of 16 (thus providing a built-in delay such that the user may, for example, increment the current cable selection from cable 1 to cable 4 without microcontroller 600 generating any output control signals selecting the intermediate cables 2 or 3).

Once the timer count has been incremented by interrupt routine 10B to exceed or equal the value of 16, microcontroller 600 resets the timer count to zero (block 644) and transmits a 420 Hz data stream to the 4-port addressable cable selector 128 based on the currently selected cable setting (block 646). The following describes an exemplary data format for the transmissions from TV-top controller to a 4-port addressable cable selector 128:

| TV-TOP CONTROLLER 140→WACS UNIT 128 | | | | | |
|---|---|---|---|---|---|
| 2-word transmission. 9 tri-bits (same data sent twice) | | | | | |
| D$_8$ | D$_7$ | D$_6$ | D$_5$ | D$_4$-D$_1$ | D$_0$ |
| | | | | ∅ | 1 |
| cable 4 | cable 3 | cable 2 | cable 1 | *always | |
| | ∅-off | | | | |
| | 1-on | | | | |
| DATA RATE 420 Hz = 52 bps = 5.8 words/s | | | | | |

*Could be set to a different address so hardware from one complex (i.e. condominium) could not be used at another location.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A satellite television signal distribution system comprising:
   at least one satellite antenna receiving a block of signals transmitted by satellite, said block being disposed within a first frequency range;
   selective signal frequency altering means coupled to said antenna for altering the frequency of selected signals within said received block without demodulating said selected signals so as to provide a further block of signals having an altered signal frequency distribution as compared to said received block of signals, said further block of signals being substantially disposed within said same first frequency range;
   a distribution network coupled to said selective signal frequency altering means, said distribution network distributing said further block of signals to plural subscriber locations; and
   plural satellite receiver means, located at corresponding said plural subscriber locations, for selecting signals within said distributed further signal block and for deriving, from said selected signals, a further signal capable of being processed by standard television receiver equipment.

2. A television signal distribution system including:
   first satellite antenna means for receiving a first block of television signals transmitted by satellite;
   second satellite antenna means for receiving a second block of television signals transmitted by satellite, said received second block of signals occupying a frequency range that is at least in part coextensive with the frequency range of said received first block of signals;
   signal frequency mapping means coupled to said first and second satellite antenna means for frequency mapping selected signals from said first block of signals into a further block of television signals and for frequency mapping selected signals from said second block of received signals also into said further block of television signals without demodulating said selected signals;
   a distribution network coupled to said signal frequency mapping means, said distribution network distributing said further block of television signals to plural subscriber locations; and receiver means located at each said plural subscriber locations for selecting television signals within said further block and for deriving, from said selected television signal, a signal capable of being processed by standard home television equipment.

3. A system as in claim 2 wherein said frequency mapping means includes, for each of said received signals, first converting means for converting said received signal from an original transponder signal frequency within a predetermined signal band to an intermediate frequency signal; and second converting means connected to receive said intermediate frequency signal for converting said intermediate frequency signal to a further transponder signal frequency within said predetermined signal band without demodulating said intermediate frequency signal.

4. A system as in claim 3 wherein said first converting means includes means for programming the difference between said original transponder signal frequency and said intermediate frequency in increments on the order of 1 MHz frequency steps so as to permit correction of signal frequencies of individual transponders.

5. A television distribution system including:

first satellite antenna means for receiving a first plurality of frequency modulated television signals from a first satellite;

second satellite antenna means for receiving a second plurality of frequency modulated television signals from a second satellite different from said first satellite;

signal frequency mapping means coupled to both said first and second satellite antenna means for mapping selected television signals from said first and second pluralities of received frequency modulated television signals into the same block of frequency modulated television signals without demodulating said selected signals;

a distribution network coupled to said signal frequency mapping means, said distribution network distributing said block of frequency modulated television signals to plural subscriber locations; and plural satellite receiver means located at corresponding said plural subscriber locations for selecting one of said frequency modulated television signals within said block and for deriving, from said selected frequency modulated television signal, a further signal capable of being processed by standard television equipment, wherein said frequency mapping means includes means for shifting the frequency of at least one of said received television signals from a first transponder channel within the range of 900-1500 MHz to a second transponder channel different from said first channel also within the range of 900-1500 MHz.

6. A system as in claim 5 wherein said frequency mapping means further includes means for shifting the frequency of at least a further one of said received television signals from a further transponder channel within the range of 900-1500 MHz to said same further transponder channel within the range of 900-1500 MHz.

7. A television signal distribution system including:

satellite antenna means for receiving a plurality of television signals from satellite;

signal frequency mapping means coupled to said satellite antenna means for mapping said plurality of received television signals into plural co-extensive frequency bands without demodulating any of said mapped signals;

plural distribution cables coupled to said signal frequency mapping mans for propagating said plural co-extensive frequency bands each on a respective distribution cable;

cable selecting means connected to said plural distribution cables for selecting one of said plural cables and for applying the signals propagated by said selected cable to a single subscriber drop cable; and receiver means coupled to said subscriber drop cable for selecting a signal propagated by said selected cable and for deriving, from said selected signal, a further signal capable of being processed by standard home television equipment.

8. A system as in claim 7 wherein said satellite receiving means comprises a standard satellite receiving device of the type adapted for processing signals provided by said satellite antenna means.

9. A system as in claim 7 wherein said cable selecting means includes inhibiting means connected to receive a control signal originating at a location remote thereto for deselecting all of said plural cables in response to said control signal.

10. A system as in claim 7 wherein said satellite receiving means includes means for descrambling said selected signal.

11. A system as in claim 7 further including a line amplifier circuit for amplifying a frequency range of UHF RF signals propagating along one of said coaxial cables, said circuit comprising:

an input terminal coupled to said cable and receiving said signals;

tilt control means coupled to receive said range of signals for compensating for high frequency roll-off introduced by said coaxial cable and for providing a frequency compensated signal; and level adjusting means, connected to receive said frequency compensating signal and also connected to receive a DC control level, for attenuating said frequency compensated signal by an amount responsive to said DC control level.

12. A television signal distribution system as in claim 7 wherein said receiver means comprises a standard conventional satellite receiver of the type adapted for converting satellite signals received from a satellite antenna into signals that can be readily processed by standard home television equipment.

13. A method of distributing satellite television signals comprising the following steps:

receiving a plurality of television signals from a satellite;

frequency mapping less than all of said received television signals into a block of television signals to be distributed to plural subscriber locations so as to eliminate undesired signals, including the step of altering the frequency of at least one of said received signals without demodulating any of said frequency mapped signals;

distributing said block of television signals to said plural subscriber locations over a distribution network;

selecting a television signal from said distributed television signals carried by said distribution network in response to a subscriber input; and deriving, from said selected television signal, a further signal capable of being processed by standard home television equipment.

14. A method of receiving and distributing satellite signals comprising:
   (a) receiving a first block of plural satellite-transmitted signals;
   (b) receiving a further block of plural satellite-transmitted signals;
   (c) frequency mapping selected signals from said first block into an output block of plural signals without demodulating said signals selected from said firs block;
   (d) frequency mapping selected signals from said further block into said output block of plural signals without demodulating said signals selected from said further block; and
   (e) distributing said output block of plural signals over a distribution network to plural subscriber receivers.

15. A method as in claim 14 wherein said first and further blocks of signals are at least in part co-extensive in frequency range.

16. A method as in claim 14 wherein said output block of signals is at least in part co-extensive in frequency range with at least one of said first and further blocks of signals.

17. A method as in claim 14 wherein said frequency mapping steps (c) and (d) each include the step of independently altering the frequency of selected individual signals without demodulating said selected individual signals.

18. A method as in claim 14 wherein said frequency mapping steps (c) and (d) each include the step of frequency converting selected individual signals plural times without demodulating said selected signals.

19. A method as in claim 14 wherein said frequency mapping steps (c) and (d) each include the steps of:
   (i) converting a selected satellite transponder frequency signal from an original frequency to an intermediate frequency without demodulating said signal; and
   (ii) further converting said signal converted by said step (ii) from said intermediate frequency to a frequency in proximity to said original frequency.

20. A method as in claim 19 wherein at least one of said converting steps (i) and (ii) includes the step of correcting for errors in said original frequency of said selected transponder frequency signal.

21. A system for receiving and distributing satellite signals comprising:
   satellite signal receiving means for receiving first and further sets of plural satellite-transmitted signals;
   first frequency converting means coupled to said satellite signal receiving means for converting the frequency of a first signal selected from said first set to an output signal frequency range without demodulating said selected signal;
   second frequency converting means coupled to said satellite signal receiving means for converting the frequency of a further signal selected from said further set without demodulating said further selected signal; and
   means coupled to said first and second frequency converting means for distributing said selected signals within said output frequency range over a signal distribution network to plural subscriber receivers.

22. A system as in claim 21 wherein said first and further satellite signals at least in part occupy a co-extensive frequency range.

23. A system as in claim 21 wherein said output range is at least in part co-extensive in frequency range with at least one of said first and second sets of satellite signals.

24. A system as in claim 21 wherein said first and second frequency converting means each include means for independently altering the frequency of selected individual signals.

25. A system as in claim 21 wherein said first and second frequency converting means each include means for frequency converting selected individual signals plural times without demodulating said selected signals.

26. A system as in claim 21 wherein said first and second frequency converting means each includes:
   a first converting stage which converts a selected satellite transponder frequency signal from an original frequency to an intermediate frequency; and
   a further converting stage substantially co-located with said first converting stage, said further converting stage further converting said signal converted by said first converting stage from said intermediate frequency to a frequency in proximity to said original frequency.

27. A system as in claim 26 wherein at least one of said first and further converting stages includes correcting means for correcting for errors in said original frequency of said satellite signal.

28. In a satellite distribution head end installation of the type which distributes signals received from satellite to at least one further location remote from said head end installation over a distribution network, an arrangement for preparing said received satellite signals for distribution over said distribution network, said arrangement including:
   a first frequency converting circuit having an input coupled to said received satellite signals, said first frequency converting circuit converting a particular received satellite signal from a first frequency band to an intermediate frequency band without demodulating said particular signal;
   a further frequency converting circuit connected to receive said intermediate frequency band signal, said further frequency converting circuit further converting said converted intermediate frequency band signal from said intermediate frequency band to a further frequency substantially within said first frequency band and for providing said further frequency signal at an output thereof without demodulating said particular signal; and
   a signal distribution amplifier coupled to said further frequency converting circuit output for applying said further frequency signal to said distribution network for distribution to plural users.

29. In a satellite signal distribution system of the type which receives bands of signals transmitted by plural satellites and distributes said signals to plural user receivers via a distribution network, an arrangement for distributing only selected received satellite signals over said distribution network, said arrangement comprising:
   plural signal processing means, one corresponding to each of said plural selected signals, each of said plural signal processing means being connected to said bands of signals received from said plural satellites, each of said plural signal processing means for altering the frequency of a corresponding selected satellite signal without demodulating said corresponding signal and for providing said altered frequency signal at an output thereof; and a summing circuit coupled to the outputs of said plural signal processing means, said summing circuit applying said altered frequency signals to said distribution network for distribution to said plural user receivers.

30. An arrangement as in claim 29 wherein said plural signal processing means are each programmed such that said altered frequency signals have a frequency distribution which is different from an initial frequency distribution of said signals as received from said satellites.

31. An arrangement as in claim 29 wherein said plural signal processing means are programmed such that each said altered frequency signal has a different carrier frequency from other altered frequency signals.

32. An arrangement as in claim 29 wherein said signal processing means are programmed such that less than all of said received satellite signals are selected and undesirable received signals are not selected.

33. An arrangement as in claim 29 wherein each said signal processing means includes:
a frequency down converting circuit; and
a frequency up converting circuit,
at least one of said down converting circuit and said up converting circuit having a programmable local oscillator.

34. In a multi-user distribution network of the type including a satellite antenna for receiving signals from a satellite and a distribution network for distributing such received signals to plural user locations, a programmable signal selector/converter coupled to plural signals received from said satellite, said signal selector/converter selecting a single said satellite signal in response to programming and frequency converting said selected satellite signal for distribution over said distribution network to plural user receivers at said user locations, said selector/converter comprising:
a controller programmed with indicia of first and second frequencies;
a first conversion stage coupled to said controller for converting a selected satellite signal at said first frequency to an intermediate frequency without demodulating said selected signal; and
a second conversion stage, coupled to said first conversion stage and to said controller, for converting said selected signal from said intermediate frequency to said second frequency for distribution over said distribution network without demodulating said selected signal.

* * * * *